US005487115A

United States Patent [19]

Surka

[11] Patent Number: 5,487,115
[45] Date of Patent: Jan. 23, 1996

[54] METHOD AND APPARATUS FOR DETERMINING THE FINE ANGULAR ORIENTATION OF BAR CODE SYMBOLS IN TWO-DIMENSIONAL CCD IMAGES

[75] Inventor: Stefan Surka, Sandy Hook, Conn.

[73] Assignee: United Parcel Service, Atlanta, Ga.

[21] Appl. No.: 108,086

[22] Filed: Aug. 17, 1993

Related U.S. Application Data

[63] Continuation-in-part of Ser. No. 883,853, May 14, 1992, abandoned.

[51] Int. Cl.⁶ .................................................. G06K 9/32
[52] U.S. Cl. ..................... 382/296; 235/462; 382/199
[58] Field of Search ................................. 382/46, 44, 22, 382/21; 395/105, 117; 358/448, 462; 364/518; 345/126; 235/462, 467

[56] References Cited

U.S. PATENT DOCUMENTS

| | | | |
|---|---|---|---|
| 3,410,991 | 11/1968 | van Berkel | 282/61.11 |
| 3,833,882 | 9/1974 | Busby | 340/196.3 |
| 4,473,746 | 9/1984 | Edmonds | 250/216 |
| 4,648,120 | 3/1987 | Chittineni | 382/54 |
| 4,749,879 | 6/1988 | Peterson et al. | 307/354 |
| 4,797,943 | 1/1989 | Murayama et al. | 382/54 |
| 4,873,426 | 10/1989 | Sarna et al. | 235/462 |
| 4,910,787 | 3/1990 | Umeda et al. | 382/18 |
| 4,958,064 | 9/1990 | Kirkpatrick | 235/384 |
| 4,973,829 | 11/1990 | Ishida et al. | 235/462 |
| 4,975,977 | 12/1990 | Kurosu et al. | 382/46 |
| 4,982,342 | 1/1991 | Moribe et al. | 364/518 |
| 4,988,852 | 1/1991 | Krishnan | 235/462 |
| 4,992,650 | 2/1991 | Somerville | 235/462 |
| 5,001,766 | 3/1991 | Baird | 382/46 |
| 5,036,182 | 7/1991 | Ouchi et al. | 235/462 |
| 5,045,677 | 9/1991 | Okamura | 235/462 |
| 5,063,604 | 11/1991 | Weiman | 382/41 |
| 5,073,954 | 12/1991 | Van Tyne et al. | 382/19 |
| 5,073,958 | 12/1991 | Imme | 382/22 |
| 5,081,689 | 1/1992 | Meyer et al. | 382/22 |
| 5,120,940 | 6/1992 | Willsie | 235/462 |
| 5,142,592 | 8/1992 | Moler | 382/22 |
| 5,155,343 | 10/1992 | Chandler et al. | 235/462 |
| 5,155,344 | 10/1992 | Fardeau et al. | 235/462 |

FOREIGN PATENT DOCUMENTS

| | | |
|---|---|---|
| 0449634 | 10/1991 | European Pat. Off. . |
| 0449645 | 10/1991 | European Pat. Off. . |
| 0450878 | 10/1991 | European Pat. Off. . |
| 0026623 | 3/1978 | Japan . |
| 0052779 | 3/1986 | Japan . |
| 0162181 | 7/1987 | Japan . |
| 0123179 | 5/1988 | Japan . |

OTHER PUBLICATIONS

"Image Enhancement Processing", E. M. Winter, IBM Technical Disclosure Bulletin, vol. 19, No. 5, Oct. 1986.
"Two Sensor Bar Code Scanner Using Sensor Spacer As A Reference" R. J. Kulikowski and R. G. Pierlott, III, IBM Technical Bulletin, vol. 17, Dec. 1974.

Primary Examiner—Joseph Mancuso
Attorney, Agent, or Firm—Daniel H. Golub

[57] ABSTRACT

A system for determining the fine angular orientation of a bar code symbol in a two-dimensional pixel image. A window is selected from the two-dimensional image for processing. Edge magnitude information and edge direction information are determined for a plurality of pixels in the selected window. For each pixel in the plurality of pixels, the edge magnitude and the edge direction of each pixel is associated with at least one of a plurality of directional ranges if the edge magnitude associated with the pixel exceeds a threshold. For each directional range in the plurality of directional ranges, a density value associated with each directional range is determined in accordance with the number of pixels associated with the directional range, an angular mean value is determined in accordance with the edge directions associated with the directional range, and a noise value is determined in accordance with the edge directions associated with the directional range. At least one candidate directional range is selected in accordance with the associated density values. The fine angular orientation of a bar code symbol is determined in accordance with the edge directions associated with the candidate directional range.

34 Claims, 30 Drawing Sheets

METHOD AND APPARATUS FOR DETERMINING THE FINE ANGULAR ORIENTATION OF BAR CODE SYMBOLS IN TWO-DIMENSIONAL CCD IMAGES

CROSS-REFERENCE TO RELATED APPLICATION

The present application is a continuation-in-part of pending U.S. patent application Ser. No. 07/883,853, filed May 14, 1992, now abandoned, the contents of which are hereby incorporated herein in their entirety by reference.

FIELD OF THE INVENTION

This invention relates to the reading and processing of package labels generally and particularly to systems for locating and extracting and decoding bar codes and other symbols from low resolution, noisy or cluttered CCD images.

BACKGROUND OF THE INVENTION

Package handling and sorting operations often require recognition systems for reading bar codes and other symbols which have been affixed to packages. Some types of sorting equipment, for example, use bar code recognition systems to sort packages in accordance with information which has been included in the bar code symbol.

Overhead CCD scanner systems have employed stationary reading devices to scan labels affixed to moving packages. Such devices typically include a linear array of photosensitive cells aligned orthogonally to the motion of the package and a lens system for projecting the image at a scanning window onto the linear array. The cells of the array are scanned at a rate which is relatively high compared to the motion of the package through the read station. The images produced by such scanning equipment are often noisy and of low resolution.

Overhead CCD scanning systems which employ linear arrays and bar code laser scanners typically do not accurately determine the location and/or orientation of a bar code symbol affixed to a moving package. In high speed package sorting operations, this problem is exacerbated by the fact that individual bar code symbols, which are affixed to packages on a moving belt, will typically not have a common alignment or orientation.

A further complication to reading a bar code symbol is introduced when the symbol is embedded against a cluttered background on the moving package. The cluttered background can result from other information, besides the bar code symbol being scanned, which has been placed on the package in close proximity to the bar code symbol. A cluttered or noisy image can also result from stray marks on the package near the bar code symbol, or from a torn, smudged, or mutilated bar code symbol.

A still further complication to extracting and reading bar code symbols embedded in CCD images relates to limitations in image processing hardware that may be employed to process such images. In particular, currently available image processing boards typically include only a limited number of convolvers, thereby limiting the number of images that can be simultaneously convolved with a given mask to the number of convolvers on the image processing board. If an image processing application requires the convolution of multiple images in parallel and a separate convolver is not available on the image processing board for each image being convolved, multiple image processing boards will have to be employed thereby substantially increasing the hardware costs associated with implementing an image processing system.

It is an object of the present invention to provide a system for reading bar code symbols of varying orientation which are affixed to packages on a moving belt.

It is a further object of the present invention to provide a system for reading bar code symbols embedded against a noisy or cluttered background using low resolution scanning equipment.

It is a still further object of the present invention to provide a system for locating within an intensity image varying types of objects or symbols including bar codes, stacked bar codes, square arrays and hexagonal arrays.

It is a still further object of the present invention to provide a system for determining the fine angular orientation within an intensity image of varying types of objects or symbols including bar codes and stacked bar codes.

It is a still further object of the present invention to provide a system for determining bar widths from a two dimensional image representative of a degraded or corrupted bar code symbol.

It is a still further object of the present invention to provide an image processing system which allows a standard convolver to simultaneously convolve multiple digital binary images in parallel using the same binary convolution mask in order to determine pixel densities with each of the binary images.

Further objects and advantages of the invention will become apparent from the description of the invention which follows.

SUMMARY OF THE INVENTION

A system for determining the fine angular orientation of a bar code symbol in a two-dimensional pixel image is disclosed. A window is selected from the two-dimensional image for processing. Edge magnitude information and edge direction information are determined for a plurality of pixels in the selected window. For each pixel in the plurality of pixels, the edge magnitude and the edge direction of each pixel is associated with at least one of a plurality of directional ranges if the edge magnitude associated with the pixel exceeds a threshold. For each directional range in the plurality of directional ranges, a density value associated with each directional range is determined in accordance with the number of pixels associated with the directional range. At least one candidate directional range is selected in accordance with the associated density values. The fine angular orientation of a bar code symbol is determined in accordance with the edge directions associated with the candidate directional range.

A system for determining the fine angular orientation of a bar code symbol in a two-dimensional pixel image is disclosed. A window is selected from the two-dimensional image for processing. Edge magnitude information and edge direction information are determined for a plurality of pixels in the selected window. For each pixel in the plurality of pixels, the edge magnitude and the edge direction of each pixel is associated with at least one of a plurality of directional ranges if the edge magnitude associated with the pixel exceeds a threshold. For each directional range in the plurality of directional ranges, an angular mean value associated with each directional range is determined in accordance with the edge directions associated with the directional range. At least one candidate directional range is selected in accordance with the associated angular mean values. The fine angular orientation of a bar code symbol is determined in accordance with the edge directions associated with the candidate directional range.

A system for determining the fine angular orientation of a bar code symbol in a two-dimensional pixel image is disclosed. A window is selected from the two-dimensional image for processing. Edge magnitude information and edge direction information are determined for a plurality of pixels in the selected window. For each pixel in the plurality of pixels, the edge magnitude and the edge direction of each pixel is associated with at least one of a plurality of directional ranges if the edge magnitude associated with the pixel exceeds a threshold. For each directional range in the plurality of directional ranges, a deviation value associated with each directional range is determined in accordance with the edge directions associated with the directional range. At least one candidate directional range is selected in accordance with the associated deviation values. The fine angular orientation of a bar code symbol is determined in accordance with the edge directions associated with the candidate directional range.

DETAILED DESCRIPTION OF THE PREFERRED EMBODIMENT

The present invention is directed to a system for locating an object within an intensity image, a system for determining the fine angular orientation and/or position of an object within an intensity image and a system for image processing. The object locating system is discussed in connection with FIGS. 1–8; the object orientation system is discussed in connection with FIGS. 9 and 10; and the image processing system is discussed in connection with FIGS. 11–14. As used herein, the term "object" refers to symbols, figures, patterns, shapes or areas having dense edges. Without limitation, the term "object" includes bar code symbols, stacked bar code symbols, and arrays of squares, hexagons and other polygons.

OBJECT LOCATING SYSTEM

Figure 1:
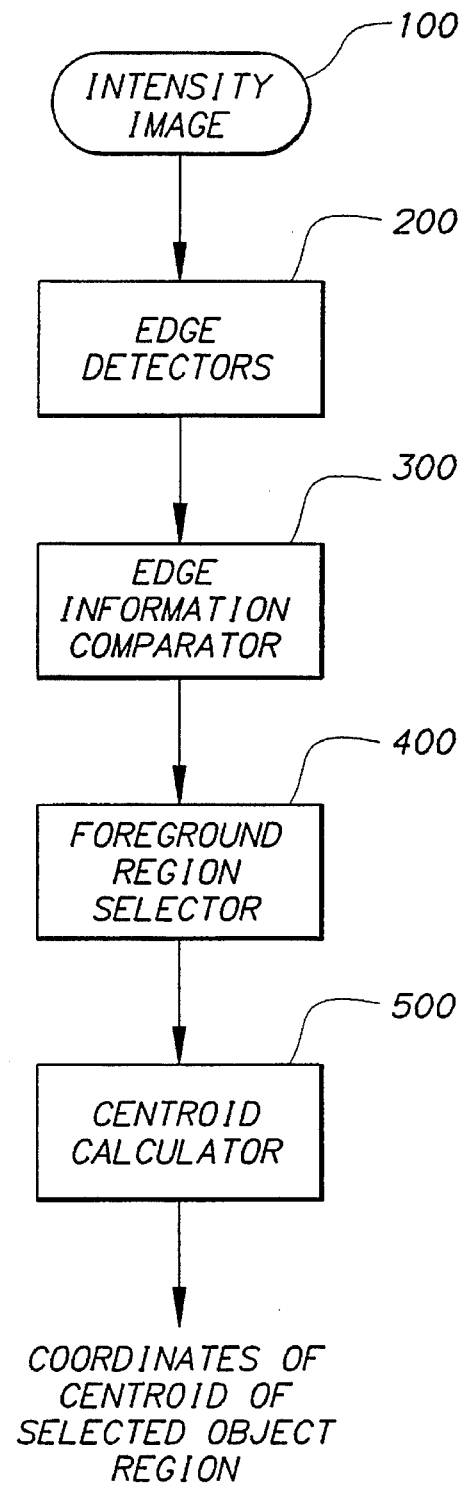
FIG. 1 is a flow diagram illustrating the operation of a preferred embodiment of a system for locating an object in an intensity image according to the present invention.

Referring now to FIG. 1, there is shown a flow diagram illustrating the operation of a preferred embodiment of a system for locating an object in an intensity image according to the present invention. The system accepts as its input intensity image 100 which is preferably a digitized gray scale representation of an imaged region being scanned. In the preferred embodiment, intensity image 100 is a low resolution pixel image derived from a linear array of CCDs. The system shown includes means 200 for analyzing an intensity image with at least two different edge detectors to detect a multiplicity of edges oriented in at least two directional ranges. Means 300 is provided for comparing information representative of detected edges angularly oriented in a first of said at least two directional ranges to information representative of detected edges angularly oriented in a second of said at least two directional ranges. Based on the results of comparisons made by means 300, means 400 selects at least one foreground region from intensity image 100 wherein detected edges are angularly oriented substantially in accordance with a target orientation. Means 500 is provided for extracting from intensity image 100 information that is representative of the foreground region selected by means 400. In the preferred embodiment, means 500 determines the position (i.e., the spatial coordinates) within intensity image 100 of the centroid (or center of mass) of an object region that corresponds to the foreground region selected by means 400.

Figure 2A:
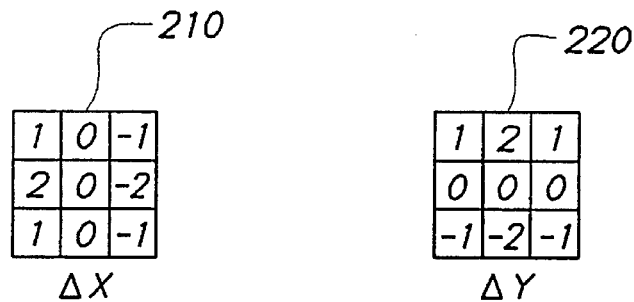
FIG. 2A shows two edge detectors used in connection with a preferred embodiment of the present invention.

Referring now to FIG. 2A, there are shown two edge detectors 210, 220 which are employed by means 200 in connection with a preferred embodiment of the present invention. In a preferred embodiment, means 200 applies edge detector 210 to intensity image 100 on a pixel-by-pixel basis to determine the X component ($\Delta X$) of each edge gradient. Similarly, edge detector 220 is applied to intensity image 100 on a pixel-by-pixel basis to determine the Y component ($\Delta Y$) of each edge gradient. Based on this X and Y component information, means 200 determines edge magnitude information ($M_n$) and direction information ($D_n$) at each pixel in intensity image 100 according to equations (1) and (2) below:

$$M_n = (\Delta X_n^2 + \Delta Y_n^2)^{1/2} \quad (1)$$

$$D_n = \arctan(\Delta Y_n / \Delta X_n) \quad (2)$$

In a preferred embodiment, intensity image 100 is formed of 782×1288 8-bit pixels and $M_n$ is normalized to range from 0–127. This normalization is achieved by dividing the result of equation (1) by 8.

Figure 2B:
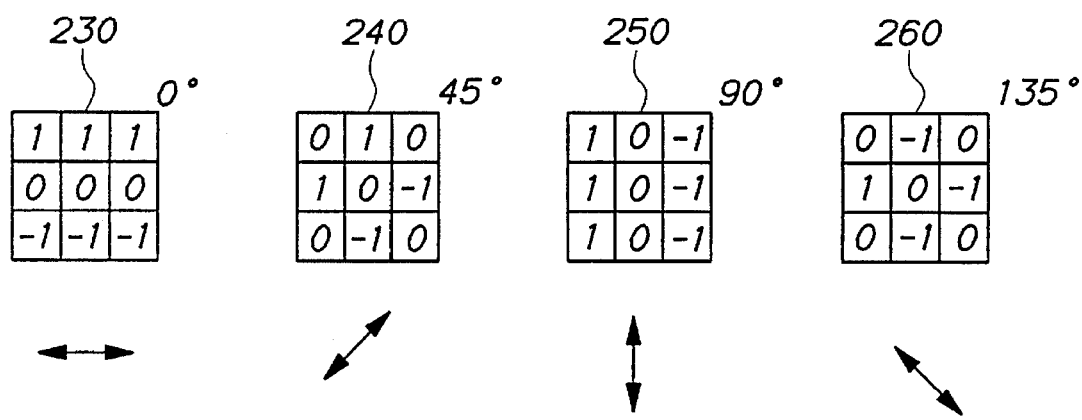
FIG. 2B shows four edge detectors used in connection with a further preferred embodiment of the present invention.

In an alternative preferred embodiment, edge detectors 230, 240, 250, 260 of FIG. 2B are applied by means 200 to determine edge magnitude information and edge direction information at each pixel in intensity image 100. More particularly, edge detector 230 is applied to intensity image 100 on a pixel-by-pixel basis to determine magnitude information corresponding to edges angularly oriented in a directional range within 22.5 degrees on either side of the 0 degree axis; edge detector 240 is applied to intensity image 100 on a pixel-by-pixel basis to determine magnitude information corresponding to edges angularly oriented in a directional range within 22.5 degrees on either side of the 45 degree axis; edge detector 250 is applied to intensity image 100 on a pixel-by-pixel basis to determine magnitude information corresponding to edges angularly oriented in a directional range within 22.5 degrees on either side of the 90 degree axis; and edge detector 260 is applied to intensity image 100 on a pixel-by-pixel basis to determine magnitude information corresponding to edges angularly oriented in a directional range within 22.5 degrees on either side of the 135 degree axis.

Edge information from means 200 is next applied to edge information comparator 300. In a preferred embodiment, edge information comparator 300 is comprised of means 310 for generating at least two feature images, means 330 for forming a composite feature image and means 350 for forming a pixel cluster region in a composite feature image.

In a preferred embodiment, means 310 generates at least two feature images by associating the edge magnitude information determined for each pixel in intensity image 100 with one of at least two corresponding directional ranges. In a first preferred embodiment, edge detectors 210, 220 are used to determine the angular orientation of each edge detected from intensity image 100, and each detected edge is then classified as being angularly oriented in one of at least three directional ranges. For example, each detected edge may be classified as being oriented in either (i) a first directional range within 30 degrees on either side of the 0 degree axis, (ii) a second directional range within 30 degrees on either side of the 60 degree axis or (iii) a third directional within 30 degrees on either side of the 120 degree axis. For each directional range, means 310 associates the detected edges angularly oriented in that directional range with a corresponding feature image. In a preferred embodiment, each feature image is formed of binary pixels which are used to represent the detected edges which have been associated with that respective feature image. The position of each binary pixel set high (or set white) in a given feature image preferably corresponds to the position in intensity image 100 of the detected edges associated with that feature image.

In an alternate preferred embodiment, each edge detected by detectors 210, 220 is classified as being angularly oriented in one or two of at least three partially overlapping directional ranges. In this embodiment, the preferred degree of overlap is approximately 5 degrees on either side of each directional range, although other amounts of overlap may be used. Thus, each detected edge may be classified as being oriented in (i) a first directional range within 35 degrees on either side of the 0 degree axis, (ii) a second directional range within 35 degrees on either side of the 60 degree axis and/or (iii) a third directional range within 35 degrees on either side of the 120 degree axis. A detected edge will be classified in only one directional range if it is not oriented in one of the overlapping range portions. Similarly, a detected edge will be classified in two directional ranges if it is oriented in an overlapping range portion. As in the paragraph immediately above, for each directional range, means 310 associates the detected edges oriented in that directional range with a corresponding feature image.

In still further alternate embodiments, means 310 may classify detected edges into other directional ranges of differing size or direction. In addition, at least two and more than three directional ranges may be used to classify the detected edges. For example, edge detectors 230, 240, 250, 260 may be used by means 310 to classify each edge from an imaged region into one of the four directional ranges associated with those edge detectors.

Figure 3:
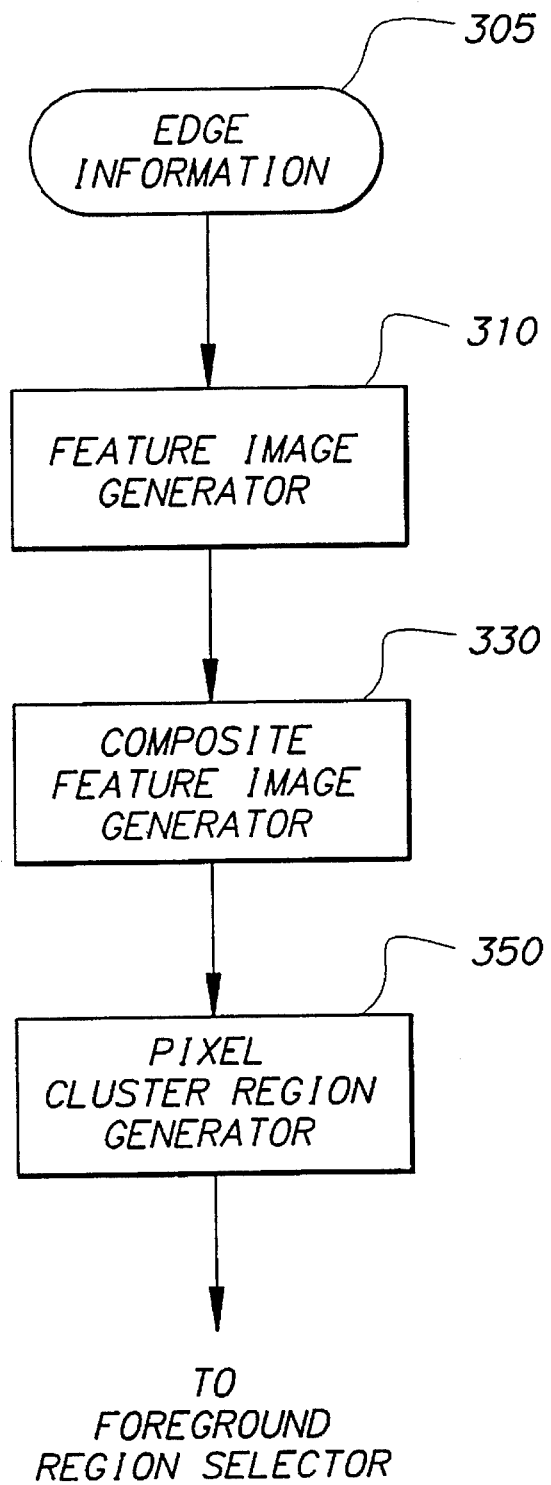
FIG. 3 is a flow diagram illustrating the operation of an edge information comparator according to a preferred embodiment of the present invention.
Figure 3A:
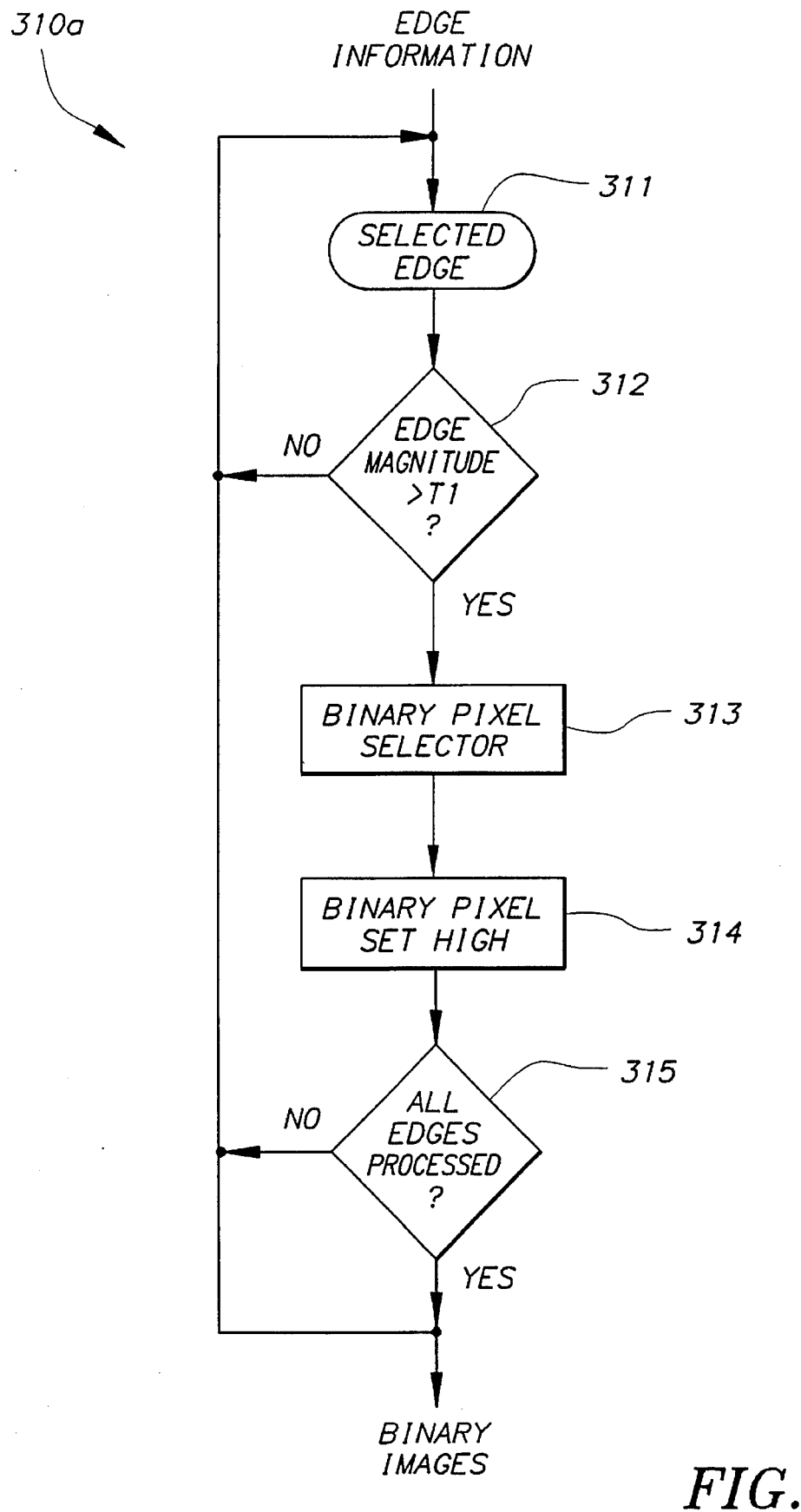
FIG. 3A is a flow diagram illustrating a process for forming binary images according to a preferred embodiment of the present invention.

Means 310 is preferably formed from means 310a for forming at least two binary images and means 310b for generating at least two feature images from the output of means 310a. Referring now to FIG. 3A, there is shown a flow diagram illustrating the operation of means 310a for forming at least two binary images, wherein each of the at least two binary images formed corresponds to one of at least two directional ranges of detected edges. Means 310a accepts as its input magnitude information and directional information for each edge detected by means 200. Means 311 is provided for selecting a detected edge for processing. Means 312 compares the magnitude information corresponding to the selected edge to a first predetermined threshold ($T_1$). If it is determined that the magnitude information corresponding to the selected edge exceeds $T_1$, means 313 selects from at least two directional ranges the one directional range corresponding to the direction of the selected edge. If the magnitude information exceeds $T_1$, means 313 also selects from at least two binary images the one binary image corresponding to the selected directional range. Means 314 then sets high the pixel in the selected binary image which corresponds in position to the position of the selected edge in intensity image 100. Means 315 is provided for repeating this process from means 311 for each detected edge.

In an alternate preferred embodiment used for processing detected edges which are to be classified in one or two of at least three partially overlapping directional ranges, means 313 selects from at least three directional ranges the one or two directional ranges corresponding to the direction of the selected edge. In this embodiment, means 313 also selects from at least three binary images the one or two binary images corresponding to the selected directional range(s). Means 314 then sets high the pixel(s) in the selected binary image(s) which correspond in position to the position of the selected edge in intensity image 100.

In a still further preferred embodiment, means 310 accepts as its input magnitude information determined by each of edge detectors 230, 240, 250, 260. The magnitude information corresponding to each detected edge is then compared against $T_1$. For each edge detected by detector 230 with a magnitude exceeding $T_1$, a binary pixel is set high in a first binary image. The position of the binary pixel set high corresponds to the position in intensity image 100 of the edge represented by that binary pixel. Similarly, for each edge detected by detector 240 with a magnitude exceeding $T_1$, a corresponding binary pixel in a second binary image is set high; for each edge detected by detector 250 with a magnitude exceeding $T_1$, a corresponding binary pixel in a third binary image is set high; and for each edge detected by detector 260 with a magnitude exceeding $T_1$, a corresponding binary pixel in a fourth binary image is set high.

Figure 6A:
FIG. 6A shows a exemplary low resolution intensity image representative of an imaged region being scanned.
Figure 6C:
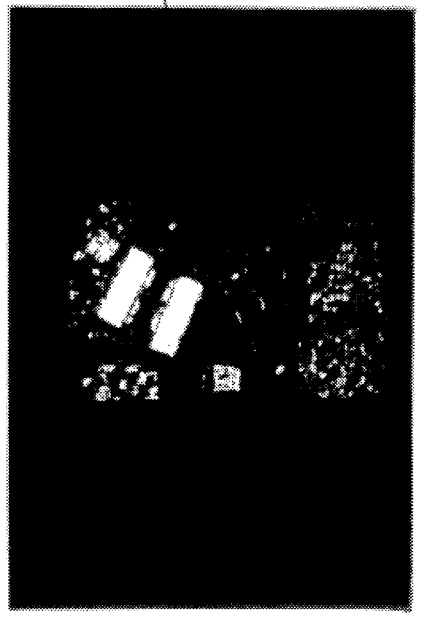
FIGS. 6B–6E show four exemplary binary images which resulted from the application of the edge detectors of FIG. 2B to the intensity image of FIG. 6A.
Figure 6E:
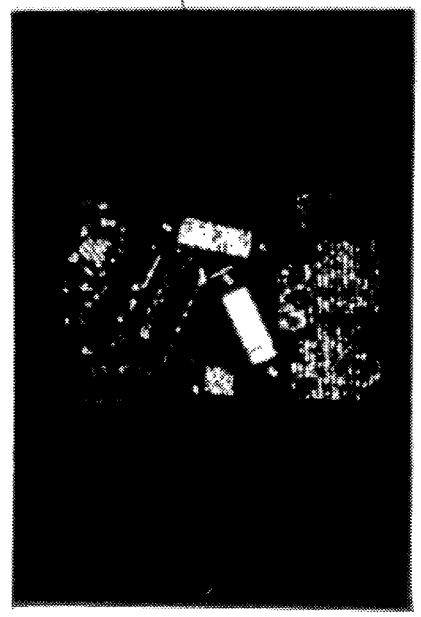
Figure 6B:
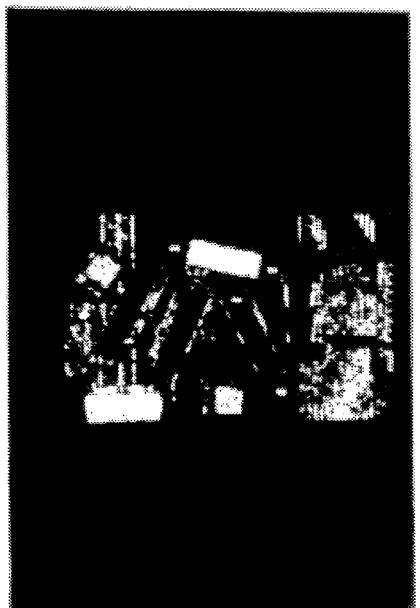
Figure 6D:
Figure 6F:
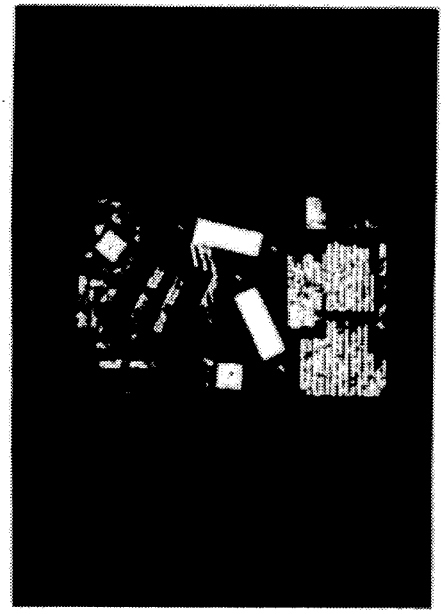
FIGS. 6F–6I show four exemplary feature images which resulted from the application of the majority dilation and minority erosion process of FIG. 3B to the binary images of FIG. 6B.
Figure 6G:
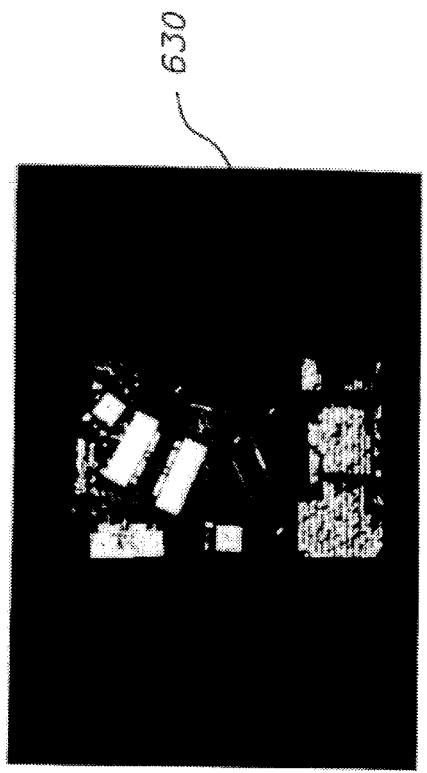
Figure 6H:
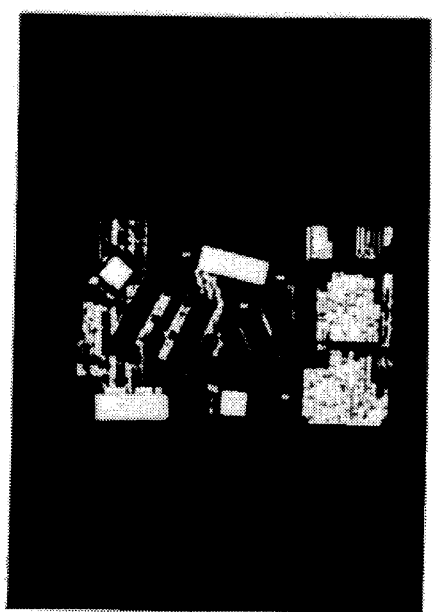
Figure 6I:
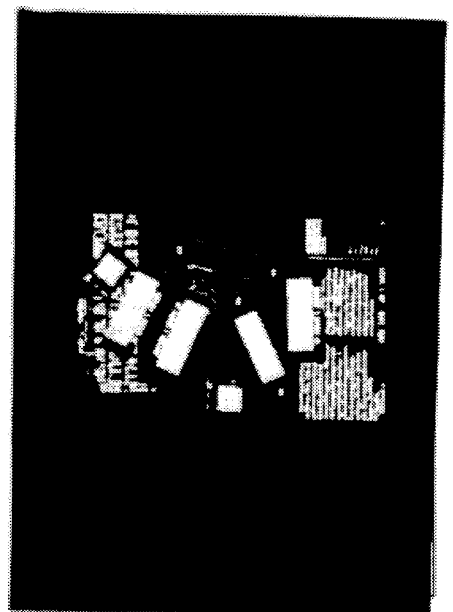

FIG. 6A shows an exemplary low resolution intensity image (610) for processing by the object locator system of the present invention. FIGS. 6B–6E show four binary images which resulted from application of edge detectors 230, 240, 250, 260 to the intensity image of FIG. 6A. Thus, the white pixels in first binary image 620 represent edges detected by detector 230 with magnitudes exceeding $T_1$ and angular orientations in the directional range within 22.5 degrees on either side of the 0 degree axis; the white pixels in second binary image 622 represent edges detected by detector 240 with magnitudes exceeding $T_1$ and angular orientations in the directional range within 22.5 degrees on either side of the 45 degree axis; the white pixels in third binary image 624 represent edges detected by detector 250 with magnitudes exceeding $T_1$ and angular orientations in the directional range within 22.5 degrees on either side of the 90 degree axis; and the white pixels in fourth binary image 626 represent edges detected by detector 260 with magnitudes exceeding $T_1$ and angular orientations in the directional range within 22.5 degrees on either side of the 135 degree axis.

In a preferred embodiment, means 310b subjects each of the at least two binary images output by means 310a to a filtering process referred to as weighed morphology or "majority dilation/minority erosion". This process is used to "dilate" areas in each binary image where the concentration of pixels set high exceeds a second predetermined threshold ($T_2$), and to "erode" areas in each binary image where the concentration of binary pixels set high does not exceed $T_2$. In a preferred embodiment of means 310b, this majority dilation/minority erosion process is also used to simultaneously perform "subsampling" on each binary image. According to this embodiment, each of the at least two binary images is divided into a plurality of regions or blocks. For example, a binary image 782×1288 pixels in dimension would preferably be divided into pixel blocks 8×8 pixels in size. Next, the concentration of binary pixels set high in each block of the plurality of blocks is determined and compared against $T_2$. An output binary image (or feature image) is then formed by representing each block from the binary image with a single binary pixel in the feature image. The single binary pixel in the feature image is set high when the corresponding block in the binary image has a determined concentration which exceeds $T_2$. The single binary pixel in the feature image is set low when the corresponding block in the binary image has a determined concentration which does not exceed $T_2$. Since a single binary pixel is used in a feature image to represent each 8×8 block of pixels in a binary image, a feature image which is 97×161 pixels in dimension will be formed from a binary image which is 782×1288 pixels in dimension.

Figure 3B:
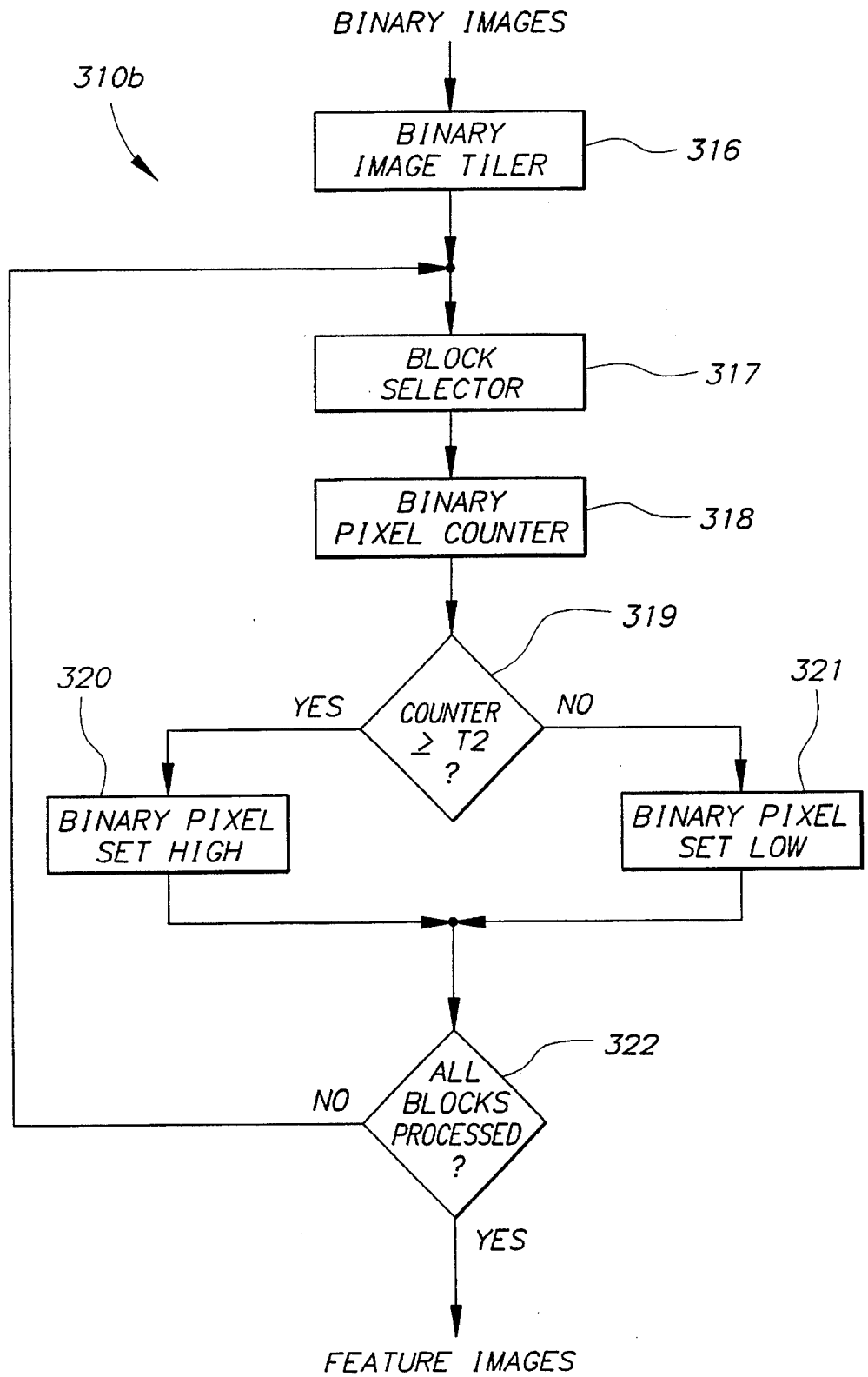
FIG. 3B is a flow diagram illustrating a process for generating feature images from binary images according to a preferred embodiment of the present invention.

Referring now to FIG. 3B, there is shown a flow diagram of means 310b for generating at least two feature images from at least two binary images according to the majority dilation/minority erosion process described above. In the embodiment shown, means 316 is provided for tiling each of the binary images into a plurality of blocks. One block from the plurality of tiled blocks is then selected by means 317 and the number of binary pixels set high in the selected block is determined by pixel counter 318. Comparing means 319 is provided for comparing the number of pixels determined by counter 318 to $T_2$. If the number of binary pixels set high in the selected block exceeds $T_2$, then means 320 sets a corresponding binary pixel in a corresponding feature image high (or white). If the number of binary pixels set high in the selected block does not exceed $T_2$, then means 321 sets a corresponding binary pixel in a corresponding feature image low (or black). Means 322 is provided for repeating this process from means 317 for each tiled block. FIGS. 6F–6I show four exemplary feature images 630, 632, 634, 636 which respectively resulted from the application of the majority dilation/minority erosion process of FIG. 3B to binary images 620, 622, 624, 626 of FIGS. 6B–6E.

In an alternate preferred embodiment of means 310b, a "sliding" window is applied to each of the at least two binary images. The sliding window is, for example, an 8×8 block of pixels. This window is first applied to the 8×8 block of pixels in the upper left hand corner of a selected binary image. The number of pixels set high in the window is compared against $T_2$. If the number of pixels in the window set high exceeds $T_2$, then a corresponding binary pixel in a corresponding feature image is set high; otherwise, the corresponding binary pixel in the corresponding feature image is set low. The window is then moved one pixel to the right and the process is repeated. This process continues until the right side of the sliding window reaches the right side of the selected binary image. At this point, the window is moved downward by one pixel and over to the left most column of pixels. This process is repeated until the sliding window reaches the bottom right hand corner of the selected binary image.

In a still further preferred embodiment of means 310b, the majority dilation/minority erosion process is achieved by first dividing each of the at least three binary images into a plurality of regions. Next, the concentration of binary pixels set high in each region of the plurality of regions is determined and compared against $T_2$. In each region where the determined concentration exceeds $T_2$, a pixel cluster region is formed by setting all binary pixels in that region high (or white). In each region where the determined concentration does not exceed $T_2$, a blank region is formed by setting all binary pixels in that region low (or black).

Figure 3C:
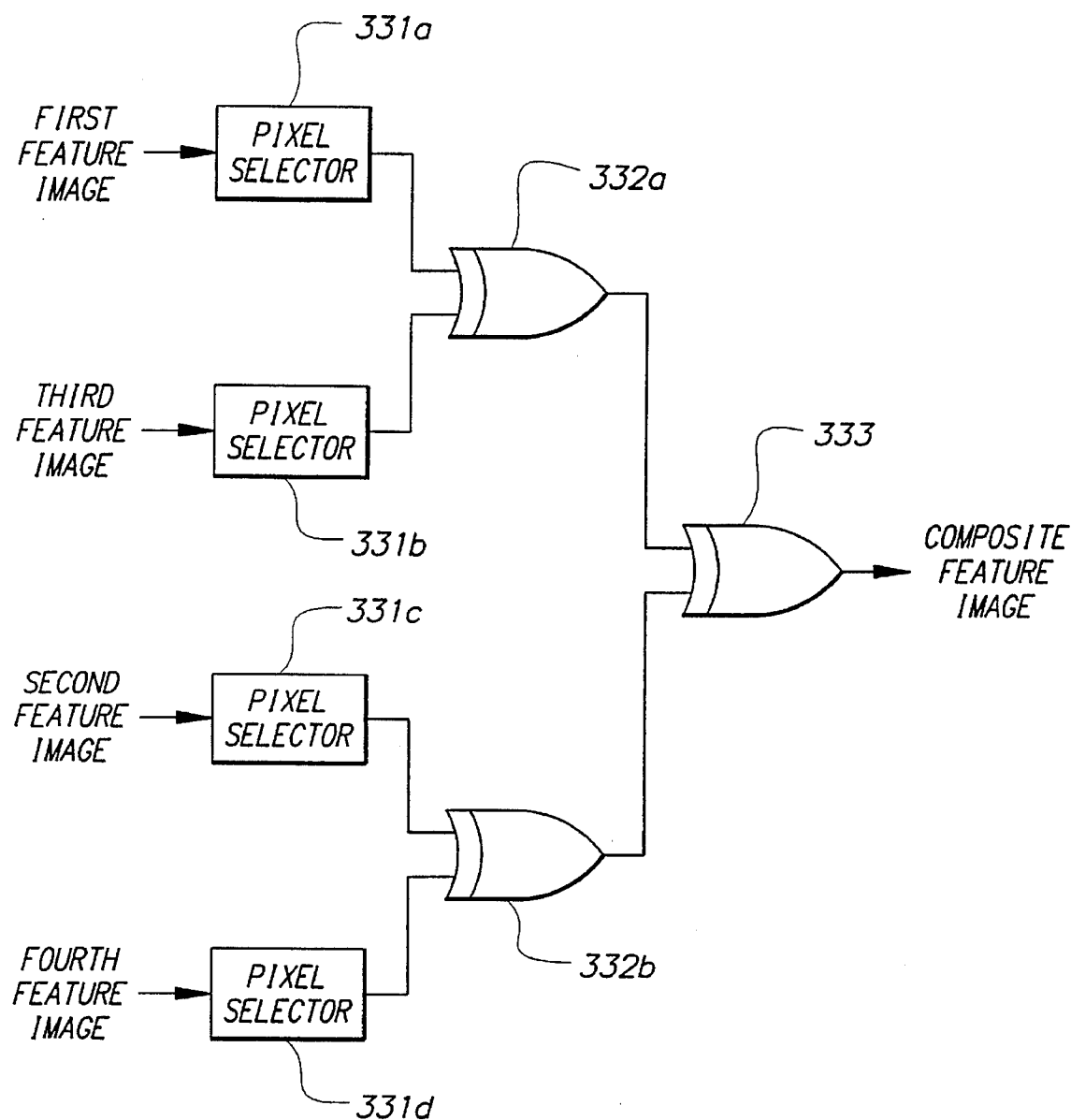
FIG. 3C is a flow diagram illustrating the operation of a composite feature image generator according to a preferred embodiment of the present invention.

The output of feature image generator 310 is provided to composite feature image generator 330. FIG. 3C is a flow diagram illustrating the operation of a preferred composite feature image generator according to the present invention. In a preferred embodiment, first, second, third and fourth feature images are provided to means 330. The first feature image having been determined from a first binary image representing edges orientated in the directional range within 22.5 degrees on either side of the 0 degree axis; the second feature image having been determined from a second binary image representing edges orientated in the directional range within 22.5 degrees on either side of the 45 degree axis; the third feature image having been determined from a third binary image representing edges orientated in the directional range within 22.5 degrees on either side of the 90 degree axis; and the fourth feature image having been determined from a fourth binary image representing edges orientated in the directional range within 22.5 degrees on either side of the 135 degree axis.

Figure 6J:
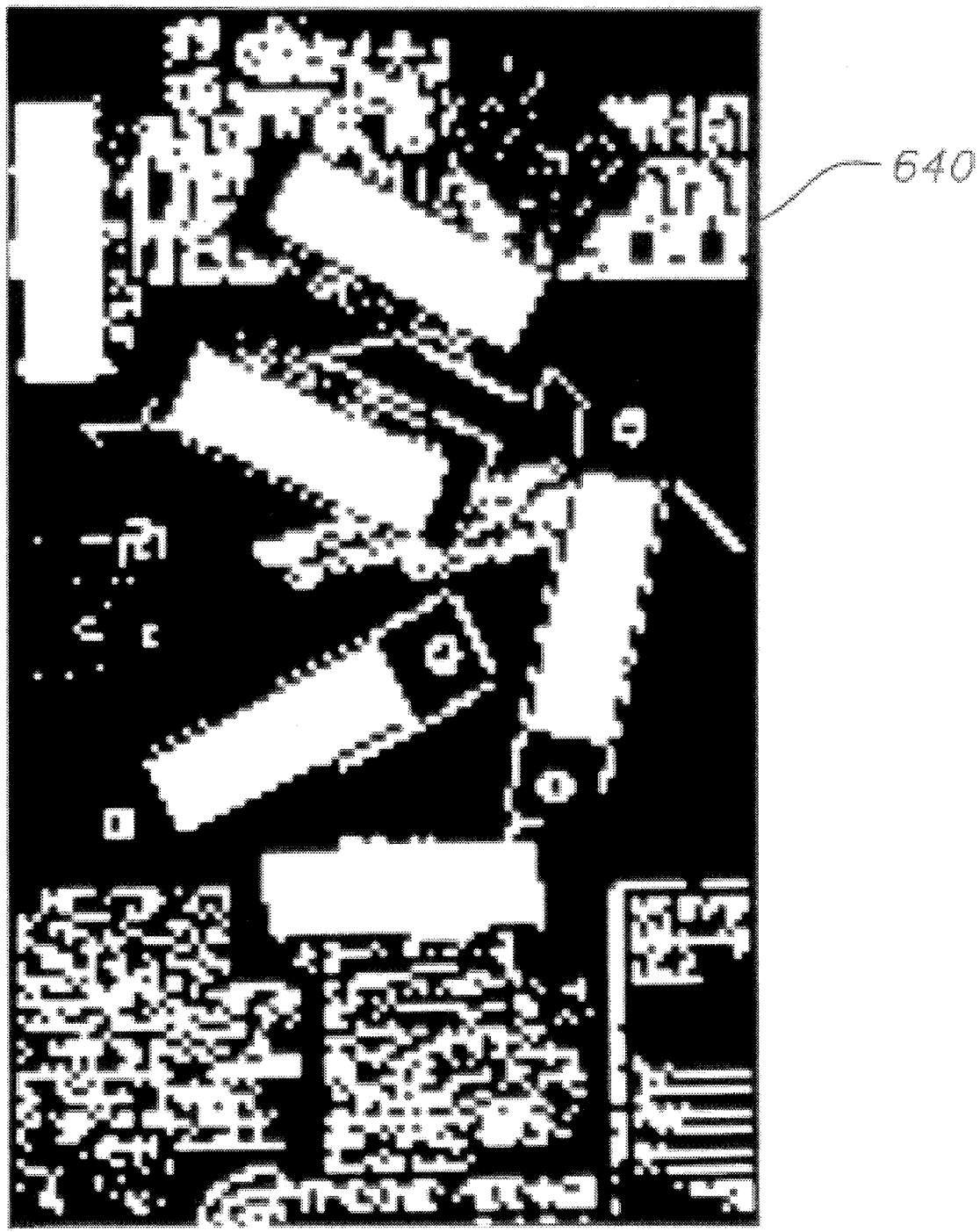
FIG. 6J shows an exemplary composite feature image which resulted from the application of the process of FIG. 3C to the feature images of FIG. 6F–6I.

Referring still to FIG. 3C, pixel selector means 331a, 331b, 331c, 331d are provided for selecting corresponding binary pixels from the first, second, third and fourth feature images. First Oring means 332a is provided for performing an exclusive logical OR operation on a binary pixel in the first feature image and a corresponding binary pixel in the third feature image, and second Oring means 332b is provided for performing an exclusive logical OR operation on a binary pixel in the second feature image and a corresponding binary pixel in the fourth feature image. The outputs of first Oring means 332a and second Oring means 332b are provided to third ORing means 333 where they are compared on a pixel-by-pixel basis. More particularly, means 333 performs a logical OR operation on its inputs and sets either high or low a corresponding binary pixel in a composite feature image depending on the result of the OR operation. The binary pixel set in the composite feature image corresponds in position to the position within each of the four feature images of the binary pixels selected by means 331a, 331b, 331c, 331d. FIG. 6J shows an exemplary composite feature image 640 which resulted from the application of the process of FIG. 3C to feature images 630, 632, 634, 636 of FIGS. 6F–6I.

Figure 3D:
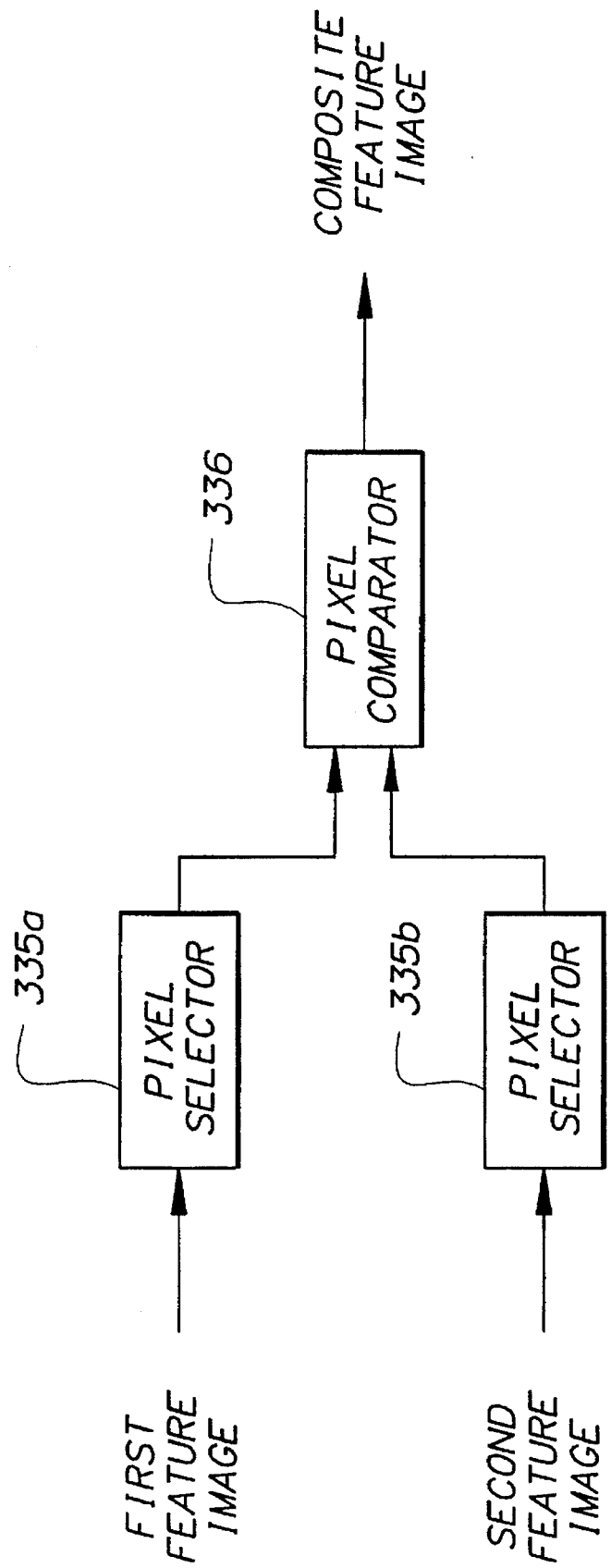
FIG. 3D is a flow diagram illustrating the operation of an alternative composite feature image generator according to a preferred embodiment of the present invention.

Referring now to FIG. 3D, there is shown an alternative composite feature image generator wherein only two feature images are provided to means 330. Pixel selector means 335a, 335b, are provided for selecting corresponding binary pixels from each of first and second feature images. Pixel comparator means 336 is provided for setting high a binary pixel in a composite feature image if only one of the two selected corresponding binary pixels is set high. In a further alternative embodiment (not shown) wherein three feature images are provided to means 330 and three corresponding binary pixels are selected from each of first, second and third feature images, pixel comparator means 336 sets high a binary pixel in a composite feature image if only one or only two of the three selected corresponding binary pixels are set high. The pixel set high in the composite feature image corresponds in position to the position within each of the feature images of the selected corresponding binary pixels. This process is repeated on a pixel-by-pixel basis for each group of corresponding pixels in the feature images.

Figure 3E:
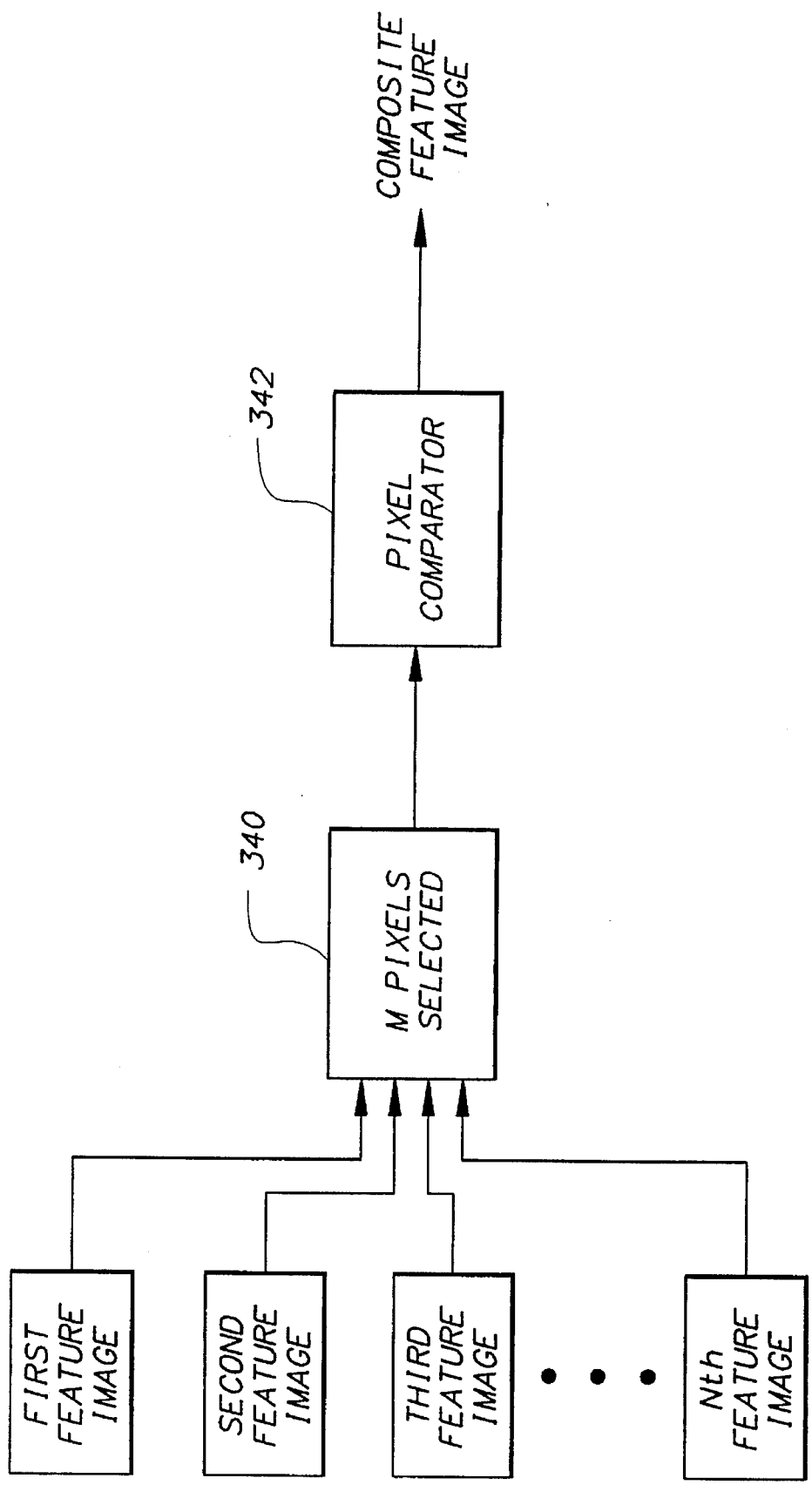
FIG. 3E is a flow diagram illustrating the operation of a still further alternative composite feature image generator according to a preferred embodiment of the present invention.

A still further alternative embodiment of a composite feature image generator according to the present invention is shown in FIG. 3E. In the embodiment shown, N feature images are provided to the composite feature image generator, wherein N is greater than or equal to two. Means 340 are provided for selecting a corresponding pixel from each of M feature images, wherein M is greater than or equal to two and less than or equal to N (for bar code symbols, M is preferably two). At least two of the M selected corresponding binary pixels are preferably selected from feature images representing edges oriented in subsequent directional ranges. For example, where M is two and there are first, second, third and fourth (N=4) feature images respectively representing detected edged in a first directional range of 22.5 degrees on either side of the 0 degree axis, a second directional range of 22.5 degrees on either side of the 45 degree axis, a third directional range of 22.5 degrees on either side of the 90 degree axis and a fourth directional range on either side of the 135 degree axis, the two selected corresponding binary pixels are preferably from either the first and second, or the second and third, or the third and fourth, or the fourth and first feature images. Means (not shown) are also provided for selecting a pixel from a composite feature image; the selected pixel in the composite feature image corresponds in position to the position within each of the M feature images of the selected corresponding binary pixels. The selected pixel from the composite feature image is then set high by pixel comparator 342 if at least one of the M selected corresponding binary pixels is set high and less than all of the M selected corresponding binary pixels are set high. This process is repeated on a pixel-by-pixel basis for each pixel in the composite feature image.

Figure 6K:
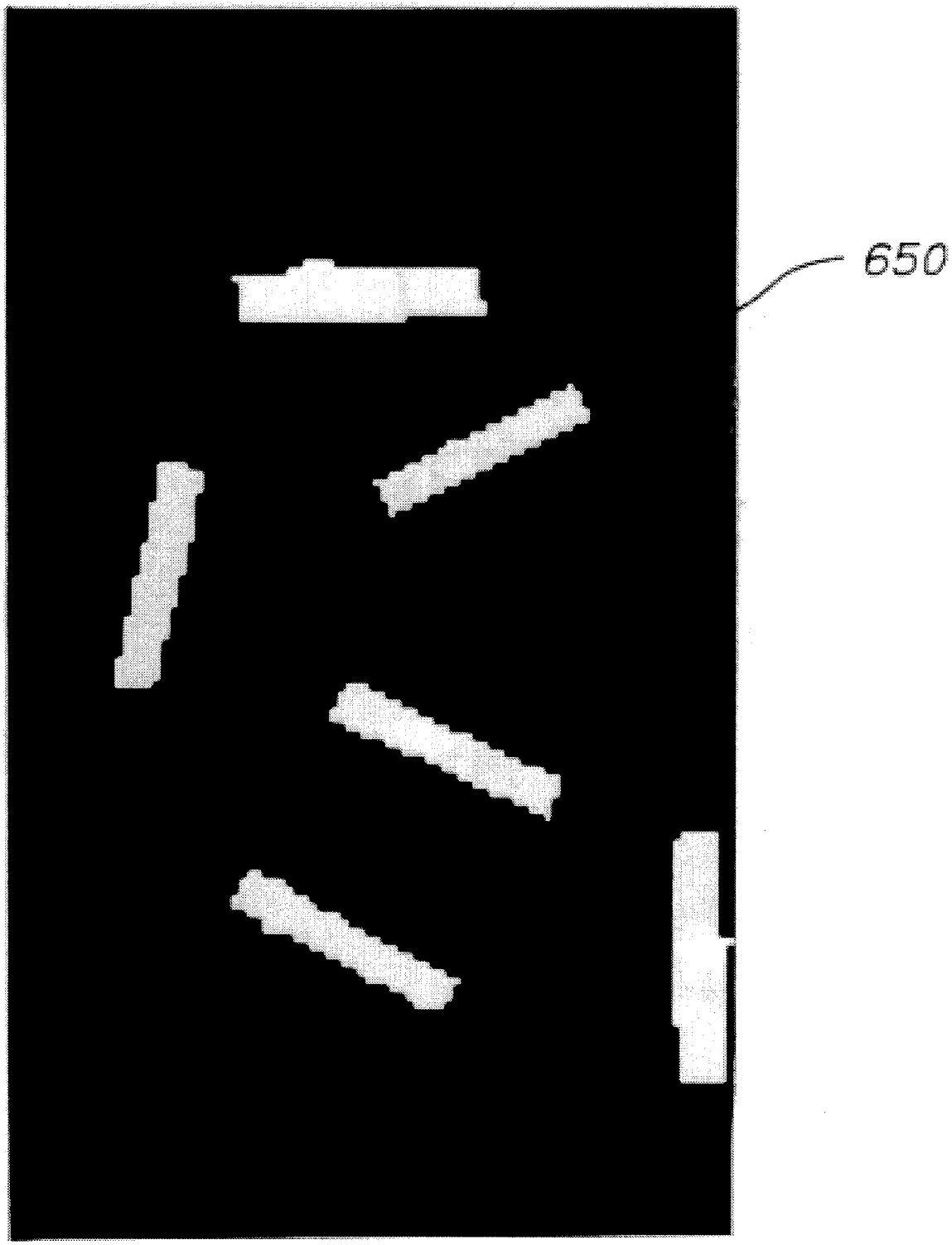
FIG. 6K shows an exemplary composite feature image which resulted from the application of the majority dilation and minority erosion process of FIG. 3F to the composite feature image of FIG. 6J.

The output of composite feature image generator 330 is provided to pixel cluster region generator 350. Pixel cluster region generator 350 filters the composite feature image using a modified version of the majority dilation/minority erosion described above. In particular, pixel cluster region generator 350 is used to "dilate" areas in the composite feature image where the concentration of pixels set high exceeds a third predetermined threshold ($T_3$), and to "erode" areas in the composite feature image where the concentration of binary pixels set high does not exceed $T_3$. In a preferred embodiment of pixel cluster region generator 350, this majority dilation/minority erosion process is achieved by applying a "sliding" window to the input composite feature image. More particularly, in the sliding window operation of pixel cluster region generator 350, a window (preferably 3×3 pixels in dimension) is first applied to the pixels in the upper left hand corner of the input composite feature image. Thus, if a window 3×3 pixels in dimension were employed, it would first be applied to the 3×3 block of pixels in the upper left hand corner of the input composite feature image. The number of pixels set high in the window is compared against $T_3$. If the number of pixels in the window set high exceeds $T_3$, then a corresponding pixel positioned in the center of the 3×3 window will be set high in the output composite feature image; otherwise, the corresponding pixel in the output composite feature image will be set low. The window is then moved one pixel to the right and the process is repeated. This process continues until the right side of the window reaches the right side of the input composite feature image. At this point, the window is moved downward one pixel and over to the left most column of pixels in the input composite feature image. This process is repeated until the sliding window reaches the bottom right hand corner of the input composite feature image. FIG. 6K shows an exemplary output composite feature image (650) which resulted from the application of the majority dilation/minority erosion process described above to composite feature image 640 of FIG. 6J.

In an alternative preferred embodiment of pixel cluster region generator 350, the majority dilation/minority erosion process is achieved by first dividing the composite feature image into a plurality of regions. Next, the concentration of binary pixels set high in each region of the plurality of regions is determined and compared against $T_3$. In each region where the determined concentration exceeds $T_3$, a pixel cluster region is formed by setting all binary pixels in that region high (or white). In each region where the determined concentration does not exceed $T_3$, a blank region is formed by setting all binary pixels in that region low (or black).

Figure 3F:
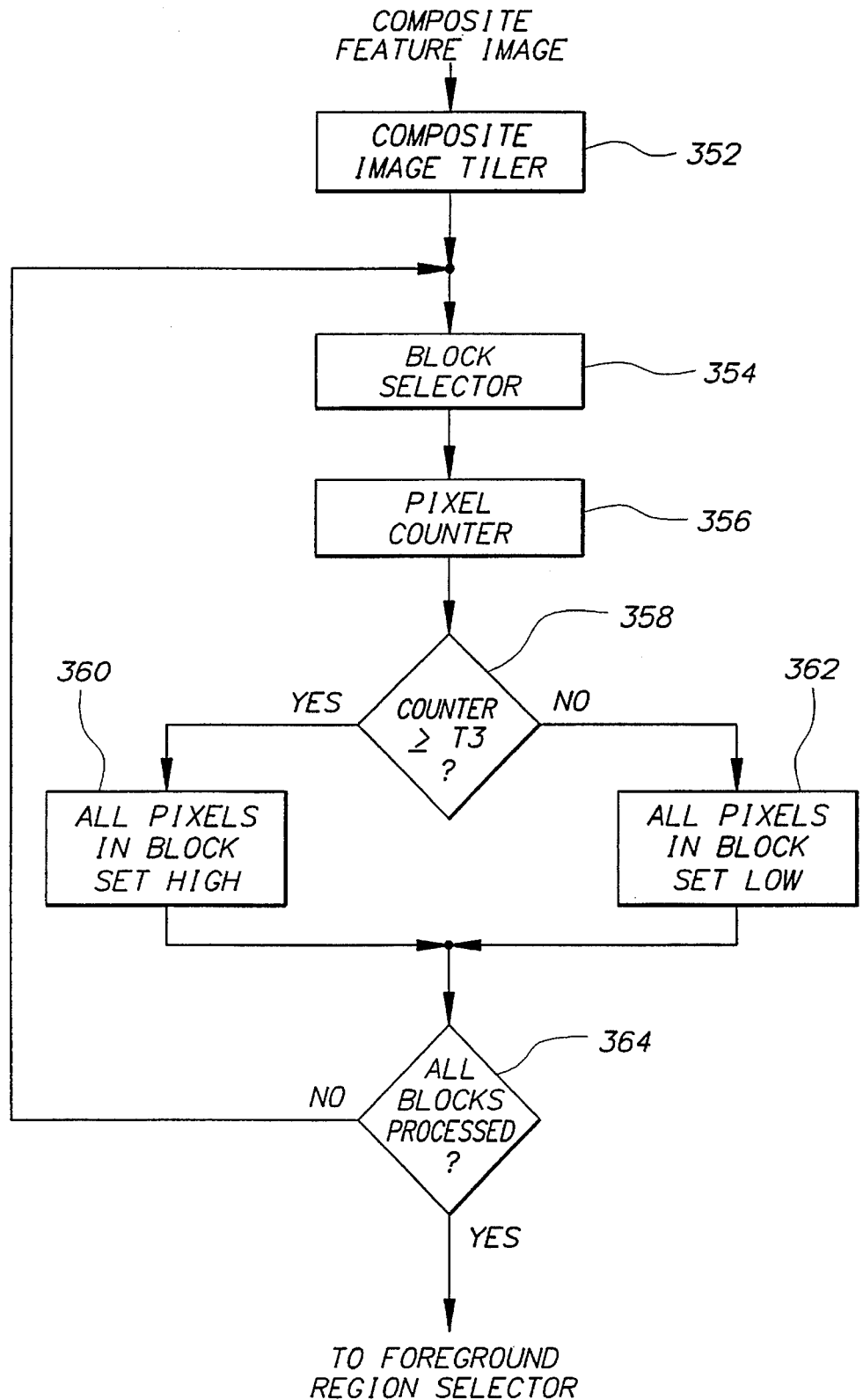
FIG. 3F is a flow diagram illustrating the operation of a pixel cluster region generator for processing a composite feature image according to a preferred embodiment of the present invention.

Referring now to FIG. 3F, there is shown a flow diagram of a pixel cluster region generator for processing a composite feature image according to the majority dilation/minority erosion process described in the paragraph immediately above. Means 352 is provided for tiling each of the composite feature images into a plurality of blocks. One block from the plurality of tiled blocks is then selected by means 354 and the number of binary pixels set high in the selected block is determined by pixel counter means 356. Comparing means 358 is provided for comparing the number of pixels determined by means 356 to $T_3$. If the number of binary pixels set high in the selected block exceeds $T_3$, then means 360 sets all binary pixels in the selected block high. If the number of binary pixels set high in the selected block does not exceed $T_3$, then means 362 sets all binary pixels in the selected block low. Means 364 is provided for repeating this process from means 354 for each tiled block.

Figure 3G:
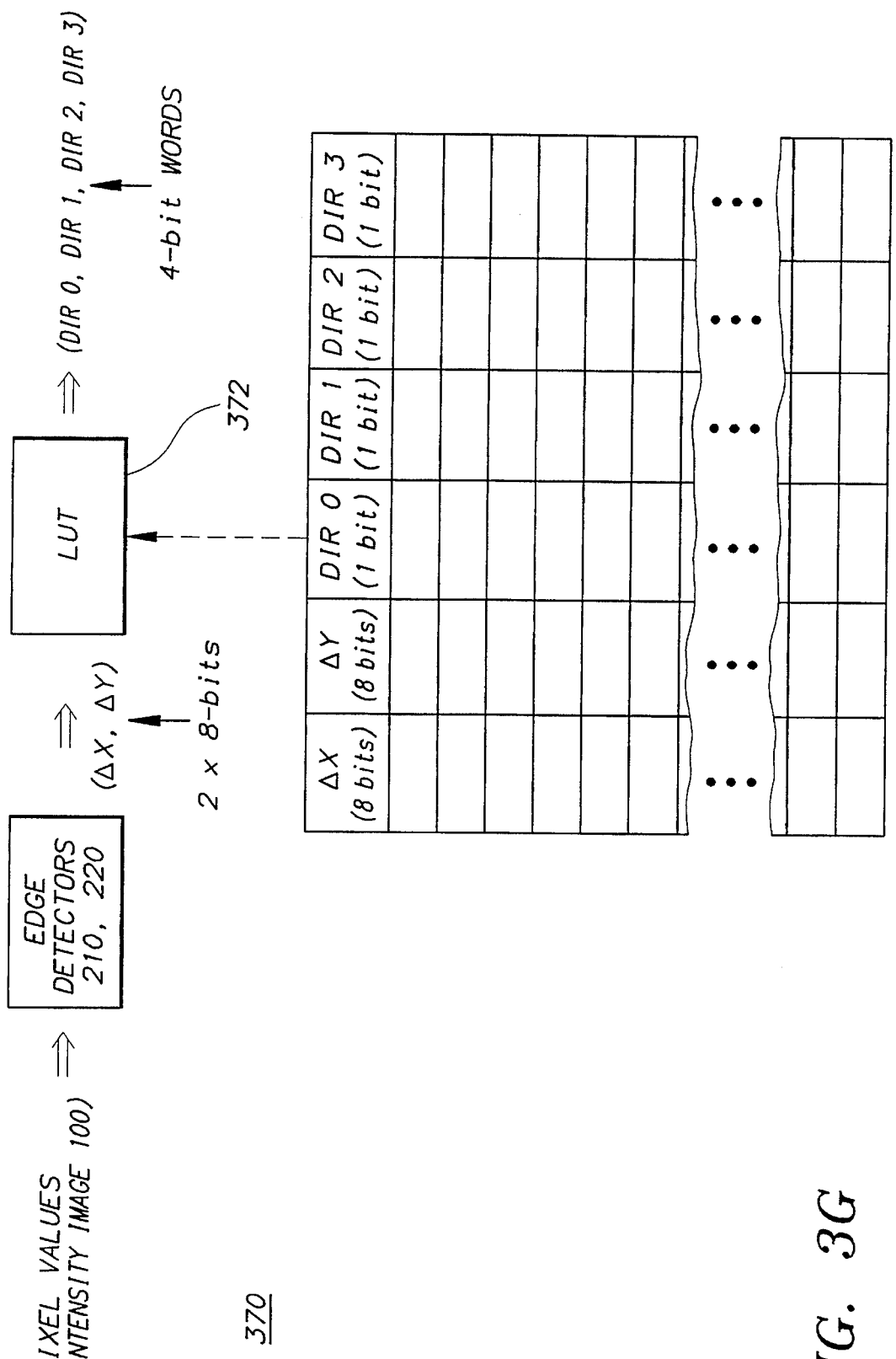
FIG. 3G is a diagram showing the operation of an apparatus for efficiently forming a plurality of binary images from an input intensity image according to a preferred embodiment of the present invention.

Referring now to FIG. 3G, there is shown a diagram illustrating a system 370 for efficiently forming a plurality of binary images from an input intensity image according to a preferred embodiment of the present invention. The operation implemented by system 370 corresponds in function to that performed by means 310a of FIG. 3A. In the embodiment shown in FIG. 3G, system 370 is configured to form four binary images, wherein each binary image corresponds to one of four directional ranges (i.e., directional range 0, directional range 1, directional range 2 and directional range 3) of detected edges. The binary image corresponding to directional range 0 preferably represents detected edges oriented within 27.5 degrees on either side of the 0 degree axis; the binary image corresponding to directional range 1 preferably represents detected edges oriented within 27.5 degrees on either side of the 45 degree axis; the binary image corresponding to directional range 2 preferably represents detected edges oriented within 27.5 degrees on either side of the 90 degree axis; and the binary image corresponding to directional range 3 preferably represents detected edges oriented within 27.5 degrees on either side of the 135 degree axis.

System 370 accepts as its input 8-bit pixel values from intensity image 100. These 8-bit input pixels are sequentially selected and applied (in 3×3 windows) to edge detectors 210, 220, thereby yielding an 8-bit $\Delta X$ value and an 8-bit $\Delta Y$ value corresponding to each pixel in intensity image 100. Next, for each input pixel selected from intensity image 100, a corresponding pair of $\Delta X$, $\Delta Y$ values are applied to look-up table (LUT) 372.

For each possible pair of $\Delta X$, $\Delta Y$ values that may applied to LUT 372, four corresponding 1-bit values (DIR0, DIR1, DIR2, DIR3) are stored in LUT 372. The values of these 1-bit entries stored in LUT 372 are preferably determined prior to the acceptance of intensity image 100 by the present invention. For each entry (or pair of $\Delta X$, $\Delta Y$ values) referenced in LUT 372, the corresponding values of DIR0, DIR1, DIR2 and DIR3 are determined by first applying the $\Delta X$, $\Delta Y$ values corresponding to the table entry to equations (1) and (2) above, thereby calculating a magnitude value ($M_n$) and a direction value ($D_n$) corresponding to the table entry. If the magnitude value ($M_n$) is less than or equal to the threshold ($T_1$), then the values in the table entry corresponding to DIR0, DIR1, DIR2 and DIR3 are all set to zero. If the magnitude value ($M_n$) is greater than the threshold ($T_1$), then the direction value ($D_n$) is compared against direction ranges 0, 1, 2 and 3 to determine which of these four directional ranges includes direction value ($D_n$). If $D_n$ falls within directional range 0 and not in any of the other directional ranges, then the value in the table entry corresponding to DIR0 will be set high and the values corresponding to DIR1, DIR2 and DIR3 will all be set low; if $D_n$ falls within directional range 1 and not within any of the other directional ranges, then the value in the table entry corresponding to DIR1 will be set high and the values corresponding to DIR0, DIR2 and DIR3 will all be set low; if $D_n$ falls within directional range 2 and not within any of the other directional ranges, then the value in the table entry corresponding to DIR2 will be set high and the values corresponding to DIR0, DIR1 and DIR3 will all be set low; and if $D_n$ falls within directional range 3 and not within any of the other directional ranges, then the value in the table entry corresponding to DIR3 will be set high and the values corresponding to DIR0, DIR1 and DIR2 will all be set low. Since directional ranges 0–3 overlap each other by 5 degrees, two of the DIR0, DIR1, DIR2, DIR3 bits will be set high if $D_n$ falls within a region where the directional ranges overlap. The purpose of using overlapping directional ranges is to ensure detection of bar code symbols that might otherwise fall at the edge of a non-overlapping angular range and thus go undetected.

Thus, for each selected input pixel from intensity image 100, a pair of ΔX, ΔY values are applied to LUT 372 which then outputs the four 1-bit values DIR0, DIR1, DIR2 and DIR3. Each of these values represents a pixel in a binary image which corresponds in location to the position of the selected input pixel in intensity image 100. More particularly, the 1-bit value DIR0 represents the value of a corresponding binary pixel in the binary image representing directional range 0; the 1-bit value DIR1 represents the value of a corresponding binary pixel in the binary image representing directional range 1; the 1-bit value DIR2 represents the value of a corresponding binary pixel in the binary image representing directional range 2; and the 1-bit value DIR3 represents the value of a corresponding binary pixel in the binary image representing directional range 3. For each input pixel from intensity image 100, the corresponding 1-bit values DIR0, DIR1, DIR2, DIR3 are grouped to form 4-bit words which are provided to system 380.

When each of the input pixels from intensity image 100 have been processed by system 370, the 4-bit words output by LUT 372 collectively represent four binary images, wherein each binary image corresponds to one of four directional ranges of edges (i.e., directional range 0, directional range 1, directional range 2 and directional range 3). Since these four directional ranges are overlapping, one or two bits within each 4-bit word output by LUT 372 will be set high. In alternate embodiments that employ binary images corresponding to non-overlapping directional ranges, only one bit within each 4-bit word output by LUT 372 may be set high.

The use of LUT 372 to form separate binary images directly from the outputs of edge detectors 210, 220 substantially simplifies the computations required to implement means 310a in real time. In particular, the use of LUT 372 to form binary images directly from the outputs of edge detectors 210, 220 eliminates the need to repeatedly calculate the magnitude (M=) and direction ($D_n$) of each edge in intensity image 100 in accordance with equations (1) and (2) above. Since equations (1) and (2) are computationally intensive, the use of a look-up table that eliminates the need to repeatedly solve these equations has the advantage of substantially enhancing the operational speed of the present invention. Although in the embodiment shown in FIG. 3G system 370 is configured to form four binary images, wherein each binary image corresponds to one of four directional ranges of detected edges, it will be understood by those skilled in the art that system 370 may be configured to form more or fewer than four binary images corresponding to different directional ranges by varying the number of columns and the content of the entries in LUT 372.

Figure 3H:
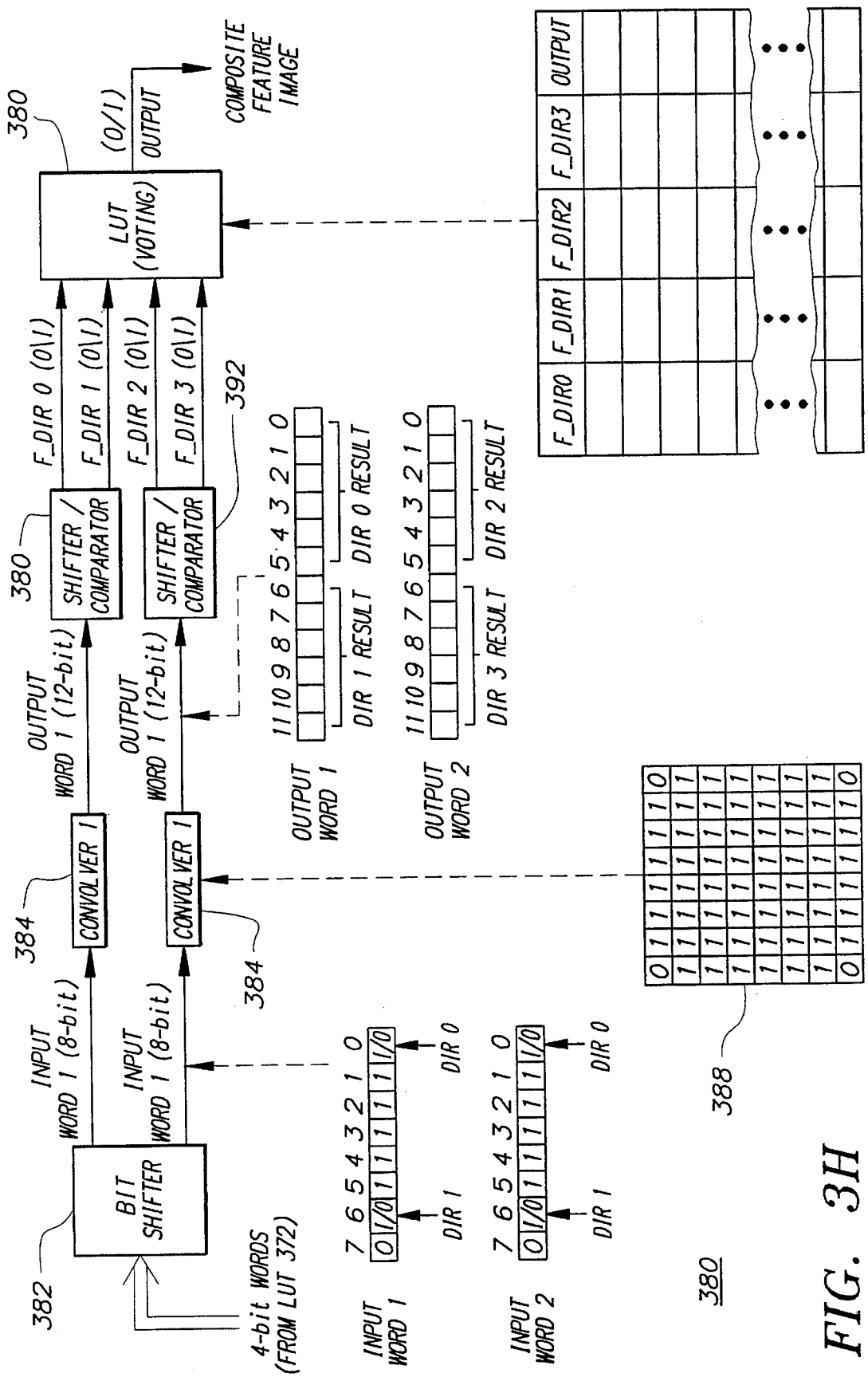
FIG. 3H is a diagram showing the operation of an apparatus for efficiently forming a composite feature image from pixels representative of a plurality of binary images according to a preferred embodiment of the present invention.

Referring now to FIG. 3H, there is shown a diagram illustrating a system 380 for efficiently forming a composite feature image from data representative of a plurality of binary images according to a preferred embodiment of the present invention. The operation implemented by system 380 corresponds in function to the operations shown by FIGS. 3B and 3C described above.

System 380 preferably accepts as its inputs the 4-bit words generated by LUT 372. Each 4-bit word is applied to bit shifter 382 which forms two 8-bit words (INPUT WORD 1 and INPUT WORD 2) from each 4-bit word that is applied thereto. More particularly, shifter 382 places the 1-bit value DIR0 in bit position 0 of INPUT WORD 1; shifter 382 places the 1-bit value DIR1 in bit position 6 of INPUT WORD 1; shifter 382 places the 1-bit value DIR2 in bit positions of INPUT WORD 2; and shifter 382 places the 1-bit value DIR3 in bit position 6 of INPUT WORD 2. Shifter 382 sets bit positions 1–5 and 7 to zero in both INPUT WORD 1 and INPUT WORD 2. Next, the 8-bit value INPUT WORD 1 output by shifter 382 is applied to convolver 384, and the 8-bit value INPUT WORD 2 output by shifter 382 is applied to convolver 386.

Convolvers 384, 386 represent standard image processing convolvers such as those found on a Datacube™ Maxvideo™ image processing system. Convolvers 384, 386 are each configured to accept 8-bit words at their inputs, each of the 8-bit words corresponding to an 8-bit pixel. The 8-bit pixels which are input to each convolver collectively correspond to an image which can be thought of as being comprised of a two-dimensional array of 8×8 pixel blocks. Each convolver 384, 386 convolves an 8×8 block of input pixels with binary mask 388 by first superimposing binary mask 388 (which is 8×8 pixels in dimension) on a respective 8×8 block of input pixels and then multiplying on a pixel-by-pixel basis each pixel from the 8×8 block of input pixels with the value from binary mask 388 that has been superimposed thereon. For each 8×8 block of input pixels input to convolver 384, a 12-bit value (OUTPUT WORD 1) is generated which represents the sum of the resultant products of its pixel-by-pixel multiplications. Similarly, for each 8×8 block of input pixels input to convolver 386, a 12-bit value (OUTPUT WORD 2) is generated which represents the sum of the resultant products of its pixel-by-pixel multiplications. As shown in FIG. 3H, binary mask 388 is preferably 8×8 binary pixels in dimension, wherein all the binary pixels in the mask are set to "1" except the pixels at the corners of the mask which are set to "0". In alternate embodiments, the number of binary pixels set to "1" in mask 388 can range from 0 to 63.

Next, OUTPUT WORD 1 and OUTPUT WORD 2 are respectively applied to shifter/comparator 390 and shifter/comparator 392. Shifter/comparator 390 forms a 6-bit value DIR0 RESULT from bit positions 0–5 of OUTPUT WORD 1, and a 6-bit value DIR1 RESULT from bit positions 6–11 of OUTPUT WORD 1. More particularly, DIR0 RESULT is a value ranging from 0–63 representing the 6 least-significant-bits of OUTPUT WORD 1, and DIR1 RESULT is a value ranging from 0–63 representing the 6 most-significant-bits of OUTPUT WORD 1. Similarly, shifter/comparator 392 forms a 6-bit value DIR2 RESULT from bit positions 0–5 of OUTPUT WORD 2, and a 6-bit value DIR3 RESULT from bit positions 6–11 of OUTPUT WORD 2. DIR2 RESULT is a value ranging from 0–63 representing the 6 least-significant-bits of OUTPUT WORD 2, and DIR3 RESULT is a value ranging from 0–63 representing the 6 most-significant-bits of OUTPUT WORD 2. For purposes of comparison to the flow diagrams shown earlier, it should be noted that each DIR0 RESULT value determined by shifter/comparator 390 is substantially equivalent to the output that binary pixel counter 318 would have yielded had counter 318 been applied to a selected 8×8 binary pixel block in the binary image corresponding to directional range 0 (as described above in conjunction with FIG. 3G); each DIR1 RESULT value determined by shifter/comparator 390 is substantially equivalent to the output that binary pixel counter 318 would have yielded had counter 318 been applied to a selected 8×8 binary pixel block in the binary image corresponding to directional range 1; each DIR2

RESULT value determined by shifter/comparator 392 is substantially equivalent to the output that binary pixel counter 318 would have yielded had counter 318 been applied to a selected 8×8 binary pixel block in the binary image corresponding to directional range 2; and each DIR3 RESULT value determined by shifter/comparator 392 is substantially equivalent to the output that binary pixel counter 318 would have yielded had counter 318 been applied to a selected 8×8 binary pixel block in the binary image corresponding to directional range 3.

Shifter/comparator 390 next compares each DIR0 RESULT with the predetermined threshold $T_2$. If the value of DIR0 RESULT is greater than $T_2$, then a value F_DIR0 which is output by shifter/comparator 390 is set high; otherwise the value of F_DIR0 is set low. Shifter/comparator 390 also compares each DIR1 RESULT with $T_2$ and, if DIR1 RESULT is greater than $T_2$, then a value F_DIR1 output by shifter/comparator 390 is set high; otherwise the value of F_DIR1 is set low. Similarly, shifter/comparator 392 compares each DIR2 RESULT with $T_2$. If the value of DIR2 RESULT is greater than $T_2$, then a value F_DIR2 output by shifter/comparator 392 is set high; otherwise the value of F_DIR2 is set low. Shifter/comparator 392 also compares each DIR3 RESULT with $T_2$ and, if DIR3 RESULT is greater than $T_2$, then a value F_DIR3 output by shifter/comparator 390 is set high; otherwise the value of F_DIR3 is set low.

For purposes of comparison to the flow diagrams and description set forth above, it should be noted that each F_DIR0 value output by shifter/comparator 390 represents a pixel in a feature image corresponding to directional range 0; each F_DIR1 value output by shifter/comparator 390 represents a pixel in a feature image corresponding to directional range 1; each F_DIR2 value output by shifter/comparator 392 represents a pixel in a feature image corresponding to directional range 2; and each F_DIR3 value output by shifter/comparator 392 represents a pixel in a feature image corresponding to directional range 3.

The four 1-bit values F_DIR0, F_DIR1, F_DIR2, F_DIR3 are next applied to LUT 394. The operation implemented by LUT 394 preferably corresponds in function to one of the voting operations shown in FIGS. 3C–3E described above. For each possible group of F_DIR0, F_DIR1, F_DIR2, F_DIR3 values that may applied to LUT 394, a single corresponding 1-bit value (Output) is stored in LUT 394. The values of the 1-bit Output entries stored in LUT 394 are preferably determined prior to the acceptance of intensity image 100 by the present invention. For each entry (or group of F_DIR0, F_DIR1, F_DIR2, F_DIR3 values) referenced in LUT 394, a corresponding 1-bit Output value is determined by performing a first exclusive logical OR operation on F_DIR0 and F_DIR2, and a second exclusive logical OR operation on F_DIR1 and F_DIR3. A logical OR operation is then performed on the results of the first and second exclusive OR operations, thereby yielding the 1-bit Output value corresponding to the table entry. For purposes of comparison, each 1-bit Output value that is output by LUT 394 corresponds to a pixel in a composite feature image.

Although in the embodiment shown in FIG. 3H, LUT 394 is configured to form a composite feature image from four feature images, wherein each feature image corresponds to one of four directional ranges of detected edges, it will be understood by those skilled in the art that LUT 394 may be configured to form a composite feature image from more or fewer than four feature images corresponding to different directional ranges by varying the number of columns and the content of the entries in LUT 394. In this way, LUT 394 can be used to implement any logical voting operation.

The output of edge information comparator 300 (i.e., a composite feature image) is provided to means 400 for selecting at least one foreground region from intensity image 100. Means 400 selects at least one foreground region wherein detected edges are angularly oriented substantially in accordance with a target orientation. In a first preferred embodiment, a foreground region selected by means 400 will typically correspond in location to the position of a bar code symbol or a stacked bar code symbol in intensity image 100. In this first embodiment, foreground region selector 400 preferably selects a foreground region with detected edges having a target orientation wherein (i) substantially all the detected edges are angularly oriented in only one or only two of four directional ranges, (ii) substantially all the detected edges are angularly oriented in only one of at least two directional ranges, or (iii) detected edges angularly oriented within at least one and less than all of at least two directional ranges are substantially present. The composite feature image generators shown in FIGS. 3C, 3D, 3E are respectively directed to the formation of composite feature images which facilitate the selection by means 400 of foreground regions in accordance with the above three target orientations.

In a second preferred embodiment, a foreground region selected by means 400 will typically correspond in location to the position of a symbol comprised of a matrix of squares. In this second embodiment, foreground region selector 400 selects at least one foreground region from an intensity image wherein a substantial percentage of detected edges in the foreground region are orthogonal with respect to each other. By selecting foreground regions in accordance with a target orientation of orthogonal edges, foreground region selector 400 may locate within an intensity image symbols coded in accordance with the Vericode™ or Datacode™ symbologies. Details of the Vericode™ and Datacode™ symbologies are disclosed in U.S. Pat. Nos. 4,924,078 and 4,939,154 which are hereby incorporated herein in their entirety by reference. A composite feature image useful for selecting foreground regions having orthogonal edges may be formed by comparing feature images corresponding to directional ranges oriented 90 degrees apart.

In a third preferred embodiment, a foreground region selected by means 400 will typically correspond in location to the position of a symbol comprised of a matrix of hexagons. In this third embodiment, foreground region selector 400 selects at least one foreground region from an intensity image wherein a substantial percentage of detected edges in the foreground region are oriented at 60 degrees with respect to each other. By selecting foreground regions in accordance with a target orientation of edges oriented at 60 degrees with respect to each other, foreground region selector 400 may locate within an intensity image symbols coded in accordance with the UPSCode™ symbology. Details of the UPScode™ symbology are disclosed in U.S. Pat. Nos. 4,998,010, 4,896,029 and 4,874,936 which are hereby incorporated herein in their entirety by reference. A composite feature image useful for selecting foreground regions having edges oriented at 60 degrees with respect to each other may be formed by comparing feature images corresponding to directional ranges oriented 60 degrees apart.

Figure 7:
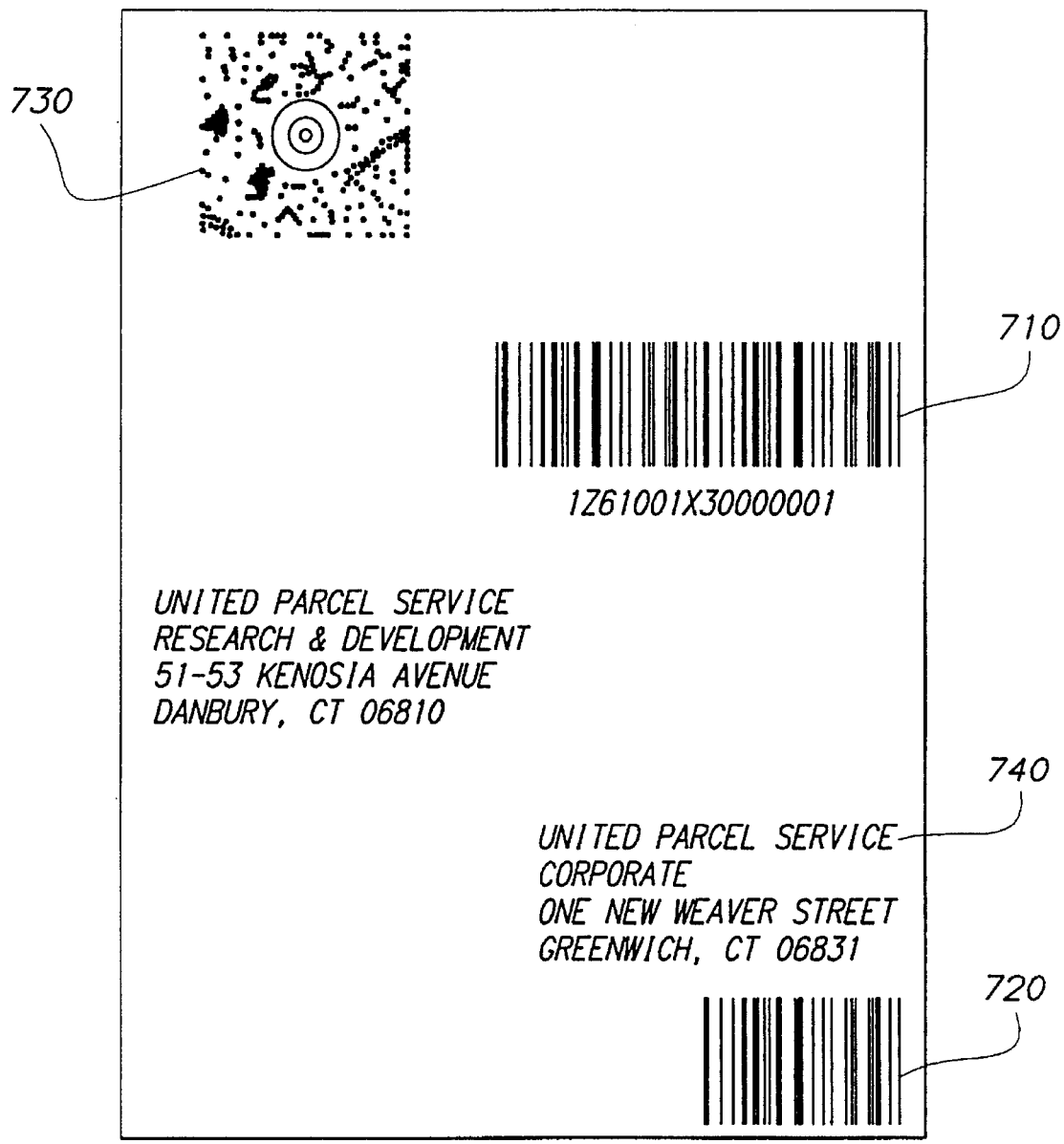
FIG. 7 shows an exemplary packaging label having a plurality of symbols with edges oriented in accordance with different target orientations.

In an alternate preferred embodiment of the object locator system of the present invention, means 400 for selecting at least one foreground region is comprised of (i) first means for selecting at least one foreground region in the intensity image wherein detected edges are angularly oriented substantially in accordance with a first target orientation, and (ii) second means for selecting at least one foreground region in the intensity image wherein detected edges are angularly oriented substantially in accordance with a second target orientation. This embodiment may be employed to process a packaging label encoded with two different types of symbologies. An exemplary packaging label encoded with both one-dimensional bar code symbols (710) and (720) and a two-dimensional code symbol (730) formed from an array of hexagons is shown in FIG. 7. Other one-dimensional symbols including stacked bar code symbols, and other two-dimensional symbols including square arrays and arrays of other polygonal shapes, may be positioned on the same label and then located in accordance with the present invention.

Figure 4:
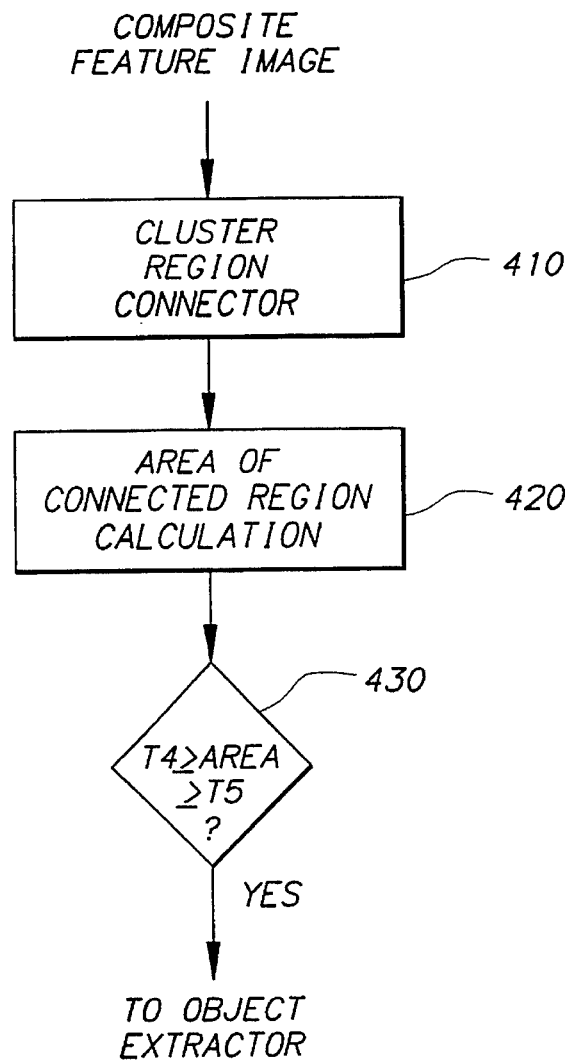
FIG. 4 is a flow diagram illustrating the operation of a foreground region selector according to a preferred embodiment of the present invention.
Figure 4A:
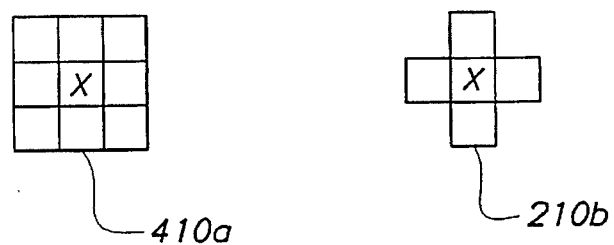
FIG. 4A shows two connectivity operators employed in connection with alternative preferred embodiments of the present invention.

Referring now to FIGS. 4 and 4A, in the preferred embodiment of the present invention, foreground region selector 400 is provided with means for processing the composite feature image prior to selecting at least one foreground region. This preferred processing step is shown in FIG. 4 and employs means 410 for connecting at least two neighboring pixels in the composite feature image to form at least one connected region. Means 410 connects neighboring pixels by applying either an eight neighbor connectivity operator (410a) or a four neighbor connectivity operator (410b) throughout the composite feature image. Means 420 for calculating the area of each connected region and means 430 for comparing each calculated area to a fourth predetermined threshold ($T_4$) and a fifth predetermined threshold ($T_5$) are also provided. Means 430 filters out of the composite feature image each connected region with an area below $T_4$ or above $T_5$. At least one foreground region is then selected by means 400 from the remaining unfiltered connected regions. In the first preferred embodiment discussed above for selecting bar code or stacked bar code symbols, the comparison against $T_4$ and $T_5$ is used to eliminate from the selection process those potential foreground regions which are either too small or too large to comprise a bar code or stacked bar code symbol.

Figure 5:
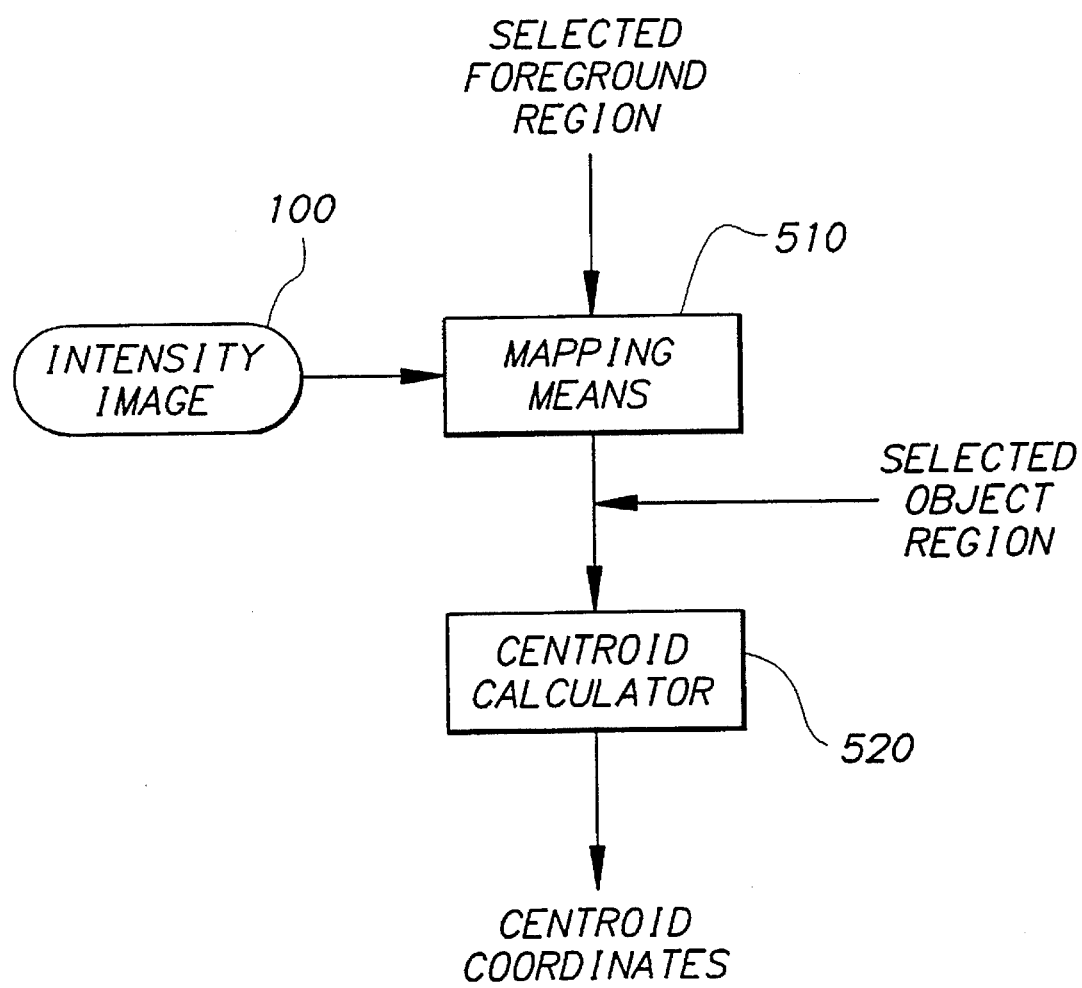
FIG. 5 is a flow diagram illustrating the operation of a system for extracting information associated with a selected object region from an intensity image according to a preferred embodiment of the present invention.

Referring now to FIG. 5, in the preferred embodiment of the present invention, output from foreground selection means 400 is provided to means 500 for extracting image information representative of at least one object from intensity image 100. Means 500 includes means 510 for mapping at least one selected foreground region onto intensity image 100 to form at least one selected object region in intensity image 100, and means 520 for calculating the coordinates (row, column) within intensity image 100 of the centroid (or center of mass) of the selected object region.

Figure 8:
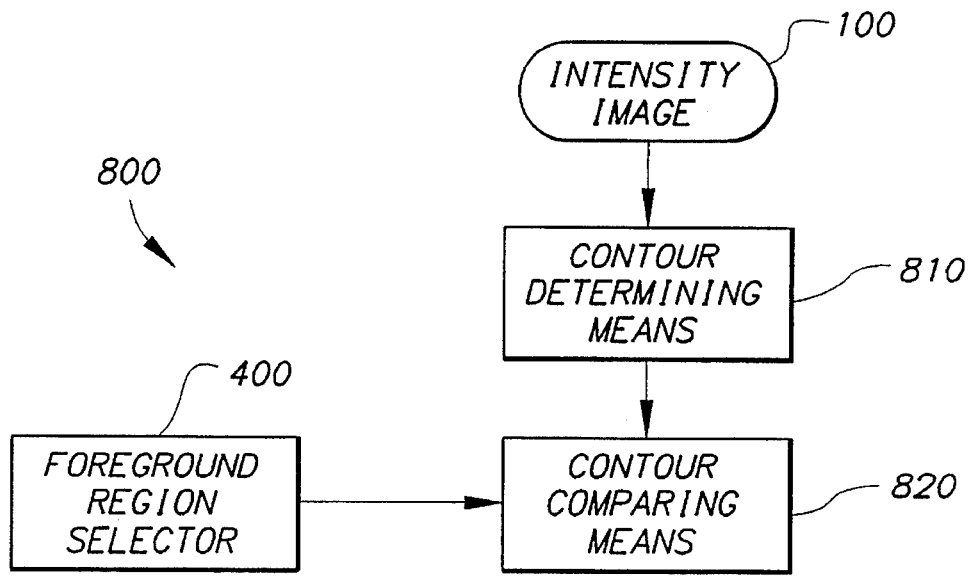
FIG. 8 is a flow diagram illustrating the operation of a pre-processing step employed in connection with a preferred embodiment of the present invention.
Figure 8A:
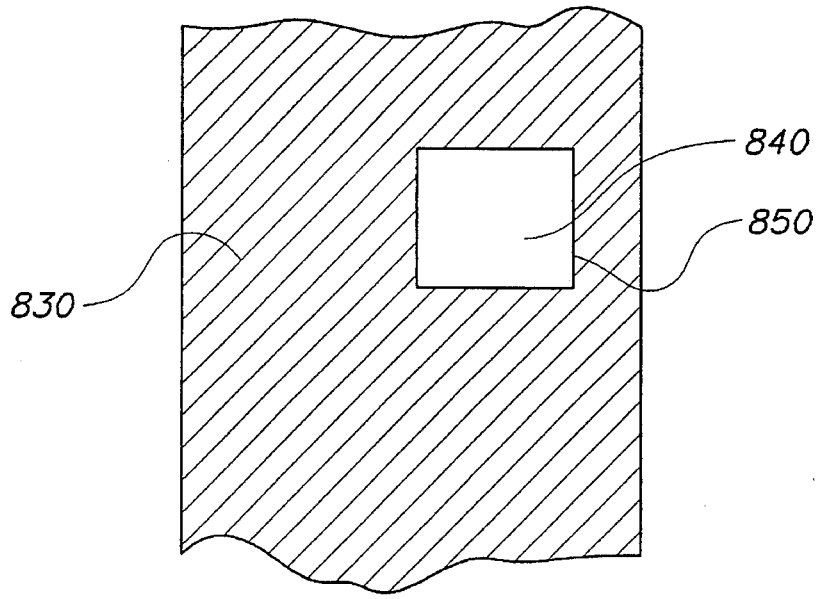
FIG. 8A shows the contour of an exemplary package positioned on a dark belt.

The object locator system of the present invention may be employed to locate bar code symbols and other types of symbols affixed to packages positioned on a moving belt. In FIG. 8, there is shown means 800 for associating each foreground region selected by means 400 with a particular package. Means 800 performs a preferred pre-processing step which allows the present invention to tie together (or associate) a plurality of symbols (for example symbols 710, 720, 730) which are affixed to the same package. Means 800 includes means 810 for determining the contour or outline of each package on a belt. As shown in FIG. 8A, belt 830 (which is preferably colored dark) appears as a large contiguous dark region when scanned; a package 840, however, appears as a contiguous bright region when scanned. Means 810 preferably determines contour 850 of package 840 by application of either a contour tracing algorithm or a connectivity operator to intensity image 100. Means 820 is provided for comparing a contour with a foreground region selected by means 400. Means 830 then associates a foreground region selected by means 400 with a package if that foreground region is positioned within the contour corresponding to that package.

The present invention may be implemented on a Datacube™ Maxvideo™ system. When edge magnitude information normalized to range from 0–127 has been determined for each pixel in an intensity image formed of 782×1288 8-bit pixels, suitable values of $T_1$, $T_4$ and $T_5$ are 24, 128 and 2048 respectively. When these parameters are used and the blocks tiled by means 316 are 8×8 pixels in dimension and the sliding window used by pixel cluster region generator 350 is 3×3 pixels in dimension, suitable values of $T_2$ and $T_3$ are 24 and 6 respectively.

OBJECT POSITIONING AND FINE ANGULAR ORIENTATION SYSTEM

Figure 9A:
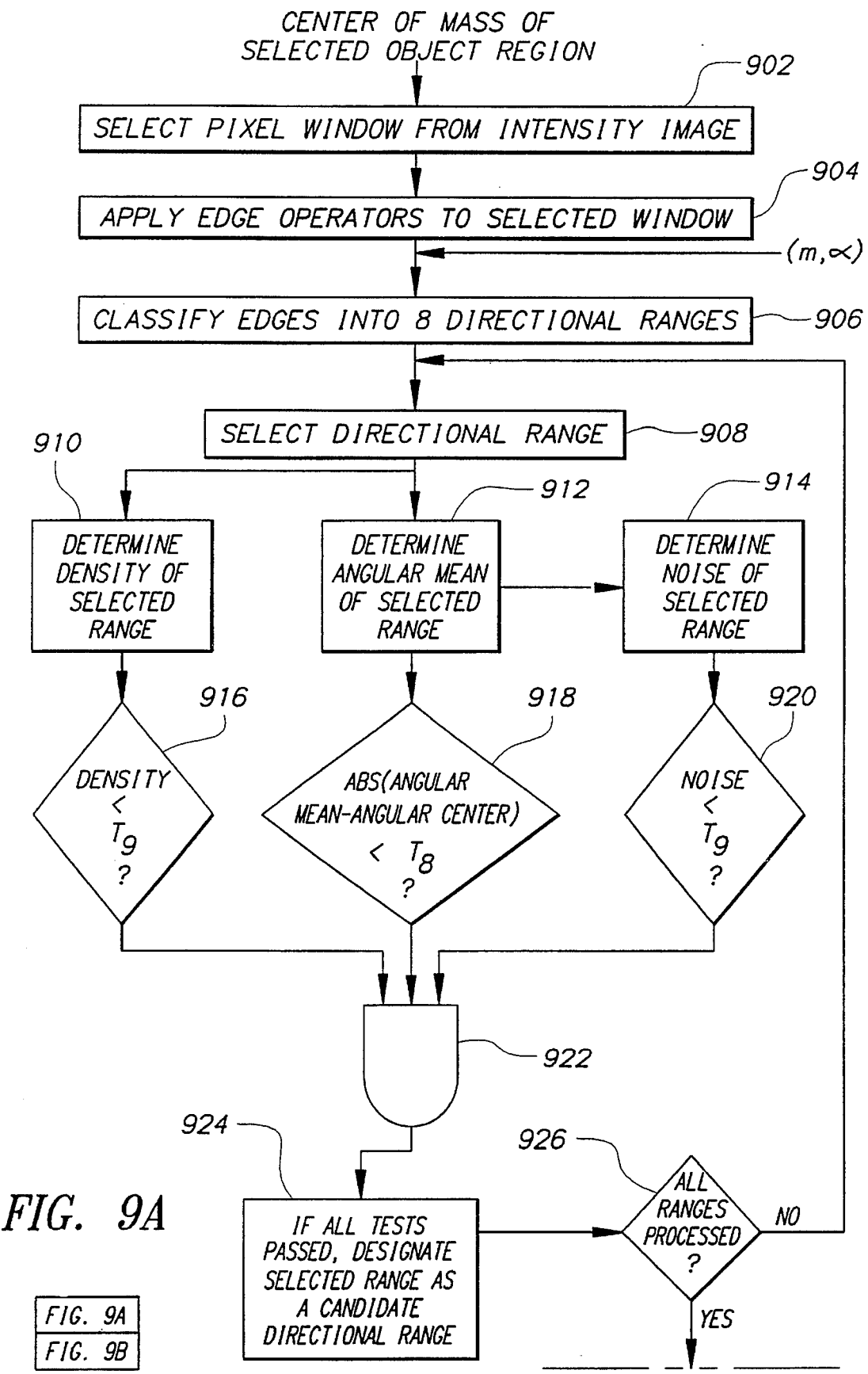
FIGS. 9A, 9B show a flow diagram illustrating the operation of a preferred system for determining the fine angular orientation of an object in an intensity image according to the present invention.
Figure 9B:
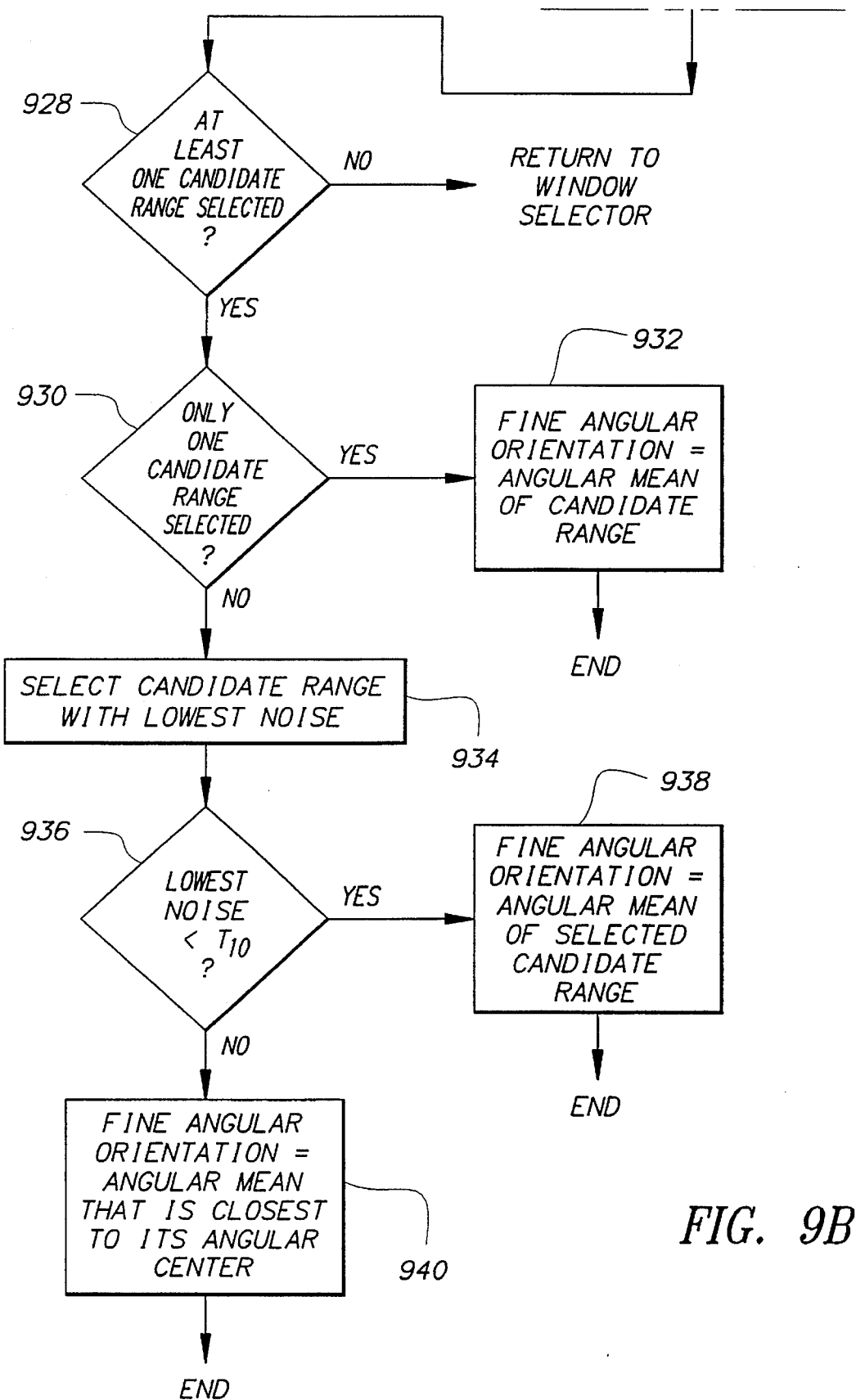
Figure 9C:
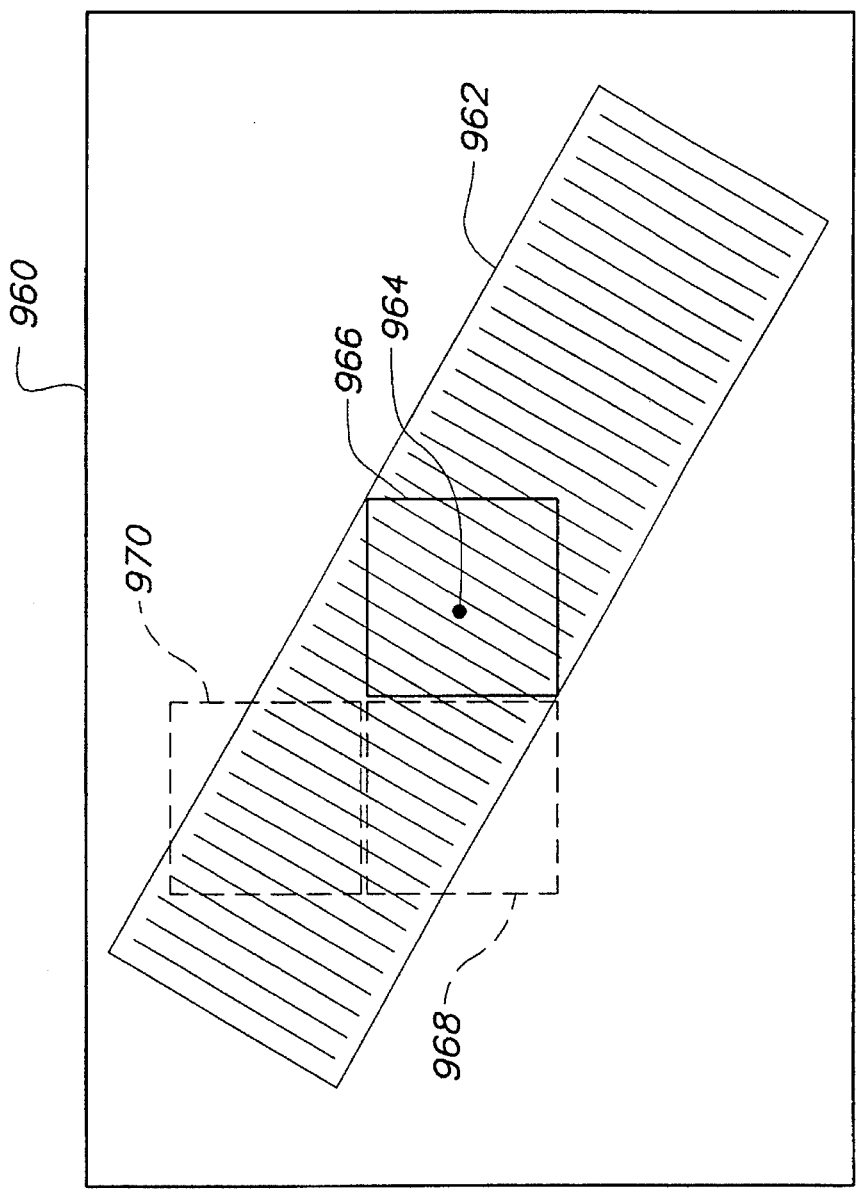
FIG. 9C shows a portion of an exemplary intensity image which includes a selected object region that has a plurality of selected pixel windows superimposed thereon.

Referring now to FIGS. 9A, 9B, there is shown a flow diagram illustrating the operation of a preferred system 900 for determining the fine angular orientation of a selected object in an intensity image according to the preferred embodiment of the present invention. System 900 accepts as its input the coordinates within intensity image 100 of the centroid (or center of mass) of a selected object region as calculated by means 520. For purposes of illustration, a portion 960 of an exemplary intensity image is shown in FIG. 9C. Portion 960 includes selected object region 962. The position of the centroid or center of mass of object 962 is identified by centroid point 964.

Window selector 902 is provided for initially selecting a pixel window from intensity image 100 which is centered about the centroid of the selected object region. In the preferred embodiment, the selected pixel window is 32×32 pixels in dimension, although windows of other dimensions may be used. For purposes of illustration, the pixel window initially selected by selector 902 corresponds to window 966 in the example of FIG. 9C. Means 904 is provided for applying edge detectors 210, 220 to each pixel in the selected window. Based on the outputs of edge detectors 210, 220, means 904 determines a magnitude value ($M_n$) and a direction value ($D_n$) for each pixel in the selected window in accordance with equations (1) and (2) above.

Figure 9D:
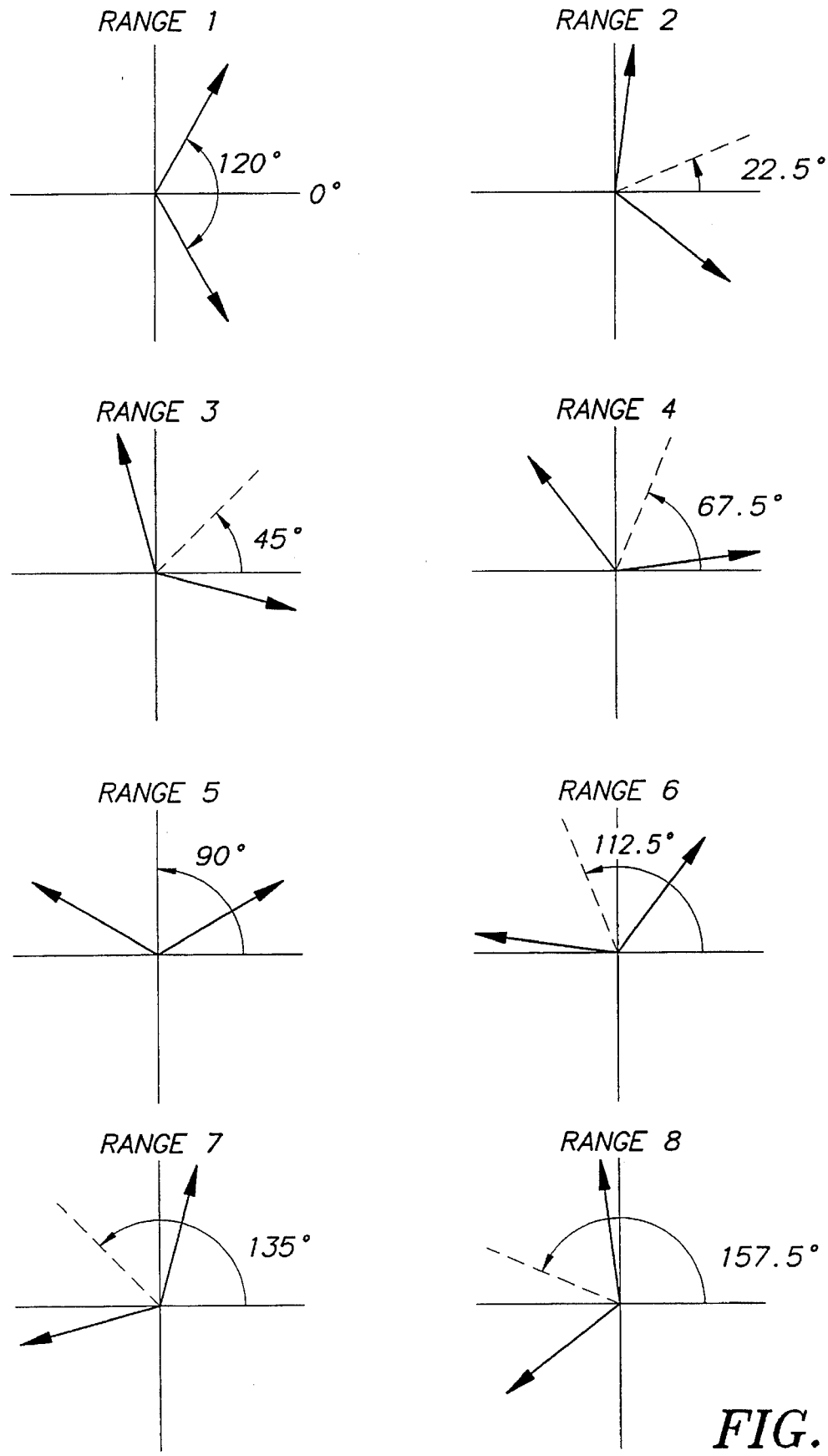
FIG. 9D shows a preferred group of directional ranges used for determining the fine angular orientation of a bar code symbol in an intensity image according to the present invention.

Classifier 906 is provided for associating each pixel in the selected window that has a magnitude value that exceeds a threshold ($T_6$) with one or more of a plurality of possible directional ranges. In the preferred embodiment, classifier 906 associates each such pixel with one or more of the eight directional ranges shown in FIG. 9D. Each of these eight preferred directional ranges spans 120 degrees. However, each of the eight preferred ranges is centered about a different angle. More particularly, as shown in FIG. 9D, Range 1 is centered about a 0 degree angle; Range 2 is centered about 22.5 degree angle; Range 3 is centered about a 45 degree angle; Range 4 is centered about a 67.5 degree angle; Range 5 is centered about a 90 degree angle; Range 6 is centered about a 112.5 degree angle; Range 7 is centered about a 135 degree angle; and Range 8 is centered about a 157.5 degree angle. For each pixel in the selected window having a magnitude value that exceeds $T_6$, classifier 906 compares the directional value corresponding to that pixel with the eight directional ranges described immediately above to select the one or ones of these eight directional ranges that include the directional value associated with the pixel. Classifier 906 then associates the pixel with each of the selected directional ranges.

After all the pixels in the selected window have been processed by classifier 906, range selector 908 selects one of the eight directional ranges shown in FIG. 9D for further processing. Although in the preferred embodiment, range selector 908 selects from eight possible directional ranges, in alternate embodiments more or fewer than eight directional ranges may be used. Density calculator 910 determines a density value corresponding to the selected range by counting the number of pixels that were associated with the selected range by classifier 906. Angular mean calculator 912 determines an angular mean value corresponding to the selected range by averaging the directional values corresponding to the pixels that were associated with the selected range by classifier 906. Deviation calculator 914 determines a deviation value corresponding to the selected range by calculating the standard deviation of the directional values corresponding to the pixels that were associated with the selected range by classifier 906.

Comparator 916 is provided for comparing the density value for the selected range with a threshold $T_7$. Comparator 918 is provided for taking the absolute value of the difference between the angular mean value for the selected range and the angular center of the selected directional range, and then comparing this absolute difference to a threshold $T_8$. For purposes of comparator 918, the angular center of Range 0 is 0 degrees; the angular center of Range 1 is 22.5 degrees; the angular center of Range 3 is 45 degrees; the angular center of Range 4 is 67.5 degrees; the angular center of Range 5 is 90 degrees; the angule center of Range 6 is 112.5 degrees; the angular center of Range 7 is 135 degrees; and the angular center of Range 8 is 157.5 degrees. Comparator 920 is provided for comparing the deviation value for the selected range with a further threshold $T_9$.

The outputs of comparators 916, 918 and 920 are coupled to AND gate 922 for performing a logical AND operation on the outputs of the three comparators. If the outputs of these three comparators are all high (corresponding to the condition where the density value for the selected range exceeds $T_7$, the absolute difference between the angular mean value for the selected range and the angular center of the selected directional range is less than $T_8$ and the deviation value for the selected range is less than $T_9$), then means 924 designates the selected directional range as a candidate directional range. In alternate embodiments, gate 922 may be replaced with other logic circuitry such that the output of gate 922 will be high (and the selected directional range will be designated as a candidate directional range) if at least one of the outputs from comparators 916, 918, 920 is high.

Repeater 926 is provided for repeating the above process starting from range selector 908 until each of the 8 directional ranges shown in FIG. 9D have been processed. When repeater 926 indicates that all 8 directional ranges have been processed, comparator 928 determines whether at least one of the 8 directional ranges was designated as a candidate directional range. If comparator 928 determines that at least one of the 8 directional ranges was designated as a candidate directional range, then comparator 930 determines whether only one of the 8 directional ranges was designated as a candidate directional range. Where only one of the 8 directional ranges was designated as a candidate directional range, means 932 determines the fine angular orientation of the selected object region to be the angular mean value associated with the one designated candidate directional range.

In the preferred embodiment, if comparator 930 determines that more than one directional range was designated as a candidate directional range, then selector 934 selects the candidate directional range having the lowest deviation value for further analysis. Comparator 936 compares this lowest deviation value to a threshold $T_{10}$. If this lowest deviation value does not exceed $T_{10}$, then means 938 determines the fine angular orientation of the selected object region to be the angular mean value associated with the candidate directional range selected by selector 934. If the lowest deviation value exceeds $T_{10}$, then means 940 compares the angular mean value associated with each candidate directional range to the angular center associated with that candidate directional range. As was the case with comparator 918, for purposes of means 940 the angular center of Range 0 is 0 degrees; the angular center of Range 1 is 22.5 degrees; the angular center of Range 3 is 45 degrees; the angular center of Range 4 is 67.5 degrees; the angular center of Range 5 is 90 degrees; the angular center of Range 6 is 112.5 degrees; the angular center of Range 7 is 135 degrees; and the angular center of Range 8 is 157.5 degrees. Means 940 then selects the candidate directional range having an angular mean value which differs the least from its associated angular center, and then determines the fine angular orientation of the selected object region to be the angular mean value associated with this selected candidate directional range.

If comparator 928 determined that no candidate directional ranges had been designated for the selected pixel window, then processing returns to window selector 902 which then selects a further pixel window for processing. In the preferred embodiment, window selector 902 next selects the 32×32 pixel window positioned immediately adjacent to the left hand edge of the pixel window that was initially selected for processing. For purposes of illustration, the second pixel window selected by selector 902 corresponds to window 968 in the example of FIG. 9C. Thereafter, the process is repeated from selector 902, wherein a further attempt is made to determine the fine angular orientation of the selected object region. If comparator 928 determines that no candidate directional ranges have been designated for the second selected pixel window, then processing returns to window selector 902 which then selects a third pixel window for processing. For purposes of illustration, the third pixel window selected by selector 902 corresponds to window 970 in the example of FIG. 9C. Thereafter, if comparator 928 determines that no candidate directional ranges have been designated for the second selected pixel window, then processing returns to window selector 902 which then selects a further pixel window for processing. Window selector 902 continues to select pixel windows adjacent to window 966 in a clockwise direction until either a candidate directional range is designated or all eight windows surrounding window 966 have been processed. If after selection and processing of all pixel windows no candidate directional range has been designated, the selected object region is rejected based on the system's inability to determine its orientation.

When edge magnitude information normalized to range from 0–127 has been determined for each pixel in intensity image 100 and the pixel window selected by selector 902 is 32×32 pixels in dimension, suitable values of $T_7$, $T_8$, $T_9$ and $T_{10}$ are 512, 30 degrees, 20 degrees and 15 degrees, respectively.

Figure 10:
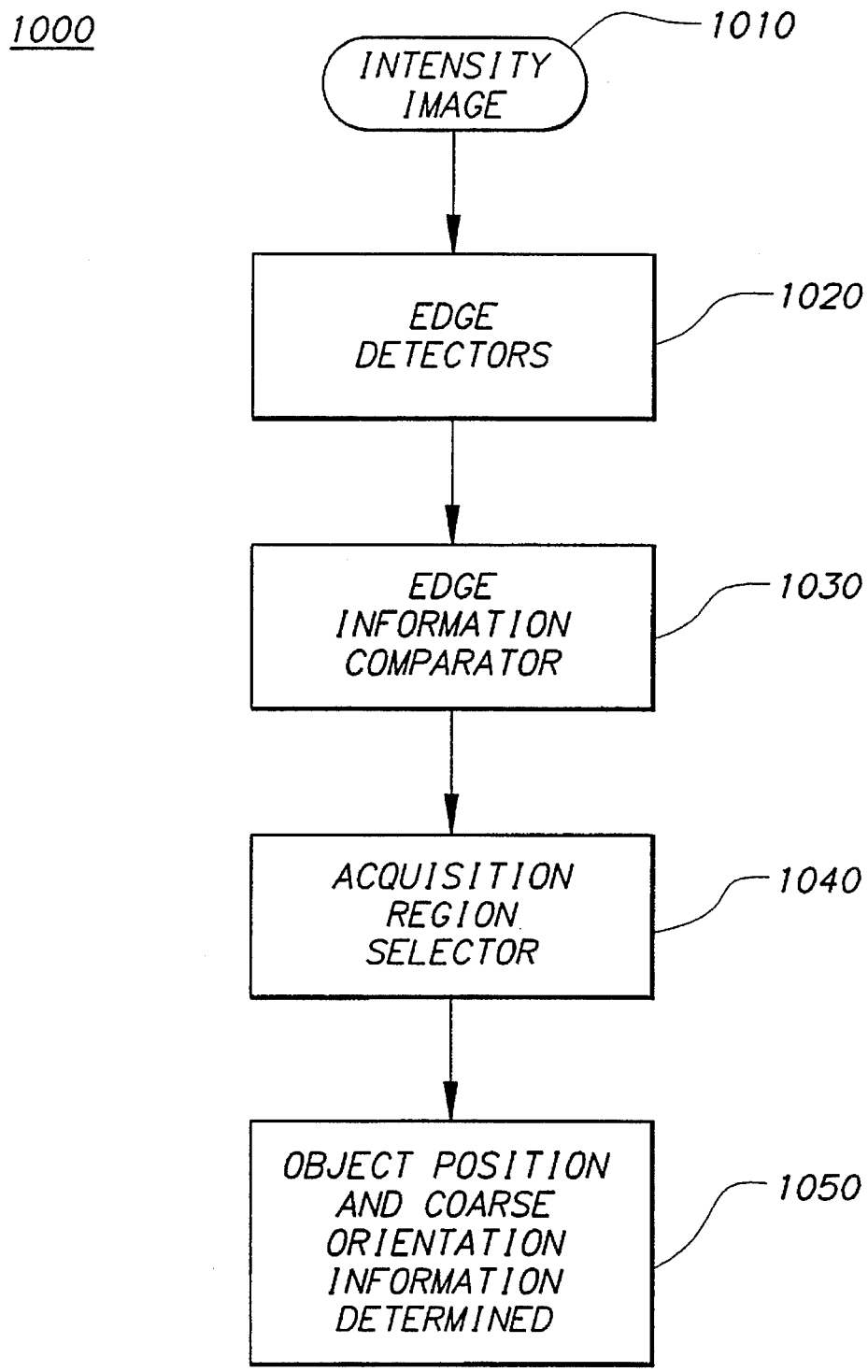
FIG. 10 is flow diagram illustrating the operation of an alternative preferred embodiment for determining the coarse orientation of an object in an intensity image according to the present invention.

Referring now to FIG. 10, there is shown a flow diagram illustrating the operation of a system 1000 for determining the coarse orientation of an object within an intensity image according to an alternate preferred embodiment of the present invention. The system accepts as its input intensity image 1010 which is preferably a digitized gray scale representation of an imaged region being scanned. In the preferred embodiment, intensity image 1010 is a low resolution image derived from a linear array of CCDs. The system shown includes means 1020 for analyzing intensity image 1010 with at least two different edge detectors to detect a multiplicity of edges oriented in at least two directional ranges. Means 1020 functions substantially the same as means 200 described above. Means 1030 is provided for comparing information representative of detected edges angularly oriented in a first of said at least two directional ranges and information representative of detected edges angularly oriented in a second of said at least two directional ranges. Means 1030 functions substantially the same as means 300 described above. Based on the results of comparisons made by means 1030, means 1040 selects an acquisition region from intensity image 1010 wherein detected edges are angularly oriented substantially in accordance with a target orientation. Means 1050 then determines the position and orientation of at least one object in intensity image 1010 in accordance with the selected acquisition region.

The output of means 1030 is provided to means 1040 for selecting an acquisition region from intensity image 1010. Means 1040 selects an acquisition region wherein detected edges are angularly oriented substantially in accordance with a target orientation. Means 1040 functions substantially the same as means 400 described above, except means 1040 selects an acquisition region as opposed to a foreground region. Thus, the acquisition region selected by means 1040 may correspond in location to (i) the position of a bar code symbol or a stacked bar code symbol in intensity image 1010, (ii) the position of a symbol comprised of a matrix of squares in intensity image 1010, or (iii) the position of a symbol comprised of a matrix of hexagons or other polygons in intensity image 1010.

Means 1050 determines the orientation of at least one object in intensity image 1010 in accordance with the acquisition region selected by means 1040. In system 1000, the acquisition region selected by means 1040 has a known spatial relationship to at least one object in intensity image 1010. For example, in the label of FIG. 7, symbols 710, 720, 730 will preferably have a predetermined spatial relationship which is known to means 1050. Thus, if an acquisition region representative of symbol 730 is selected, means 1050 can determine the position of symbols 710, 720 by application of a known spatial relationship to the selected acquisition region. Alternatively, a bar code symbol (such as 710) may be used by means 1050 to find (or acquire) either another bar code symbol (such as 720) or a two-dimensional symbol (such as 730) or a text block (such as 740) within intensity image 1010.

IMAGE PROCESSING SYSTEM

Figure 11:
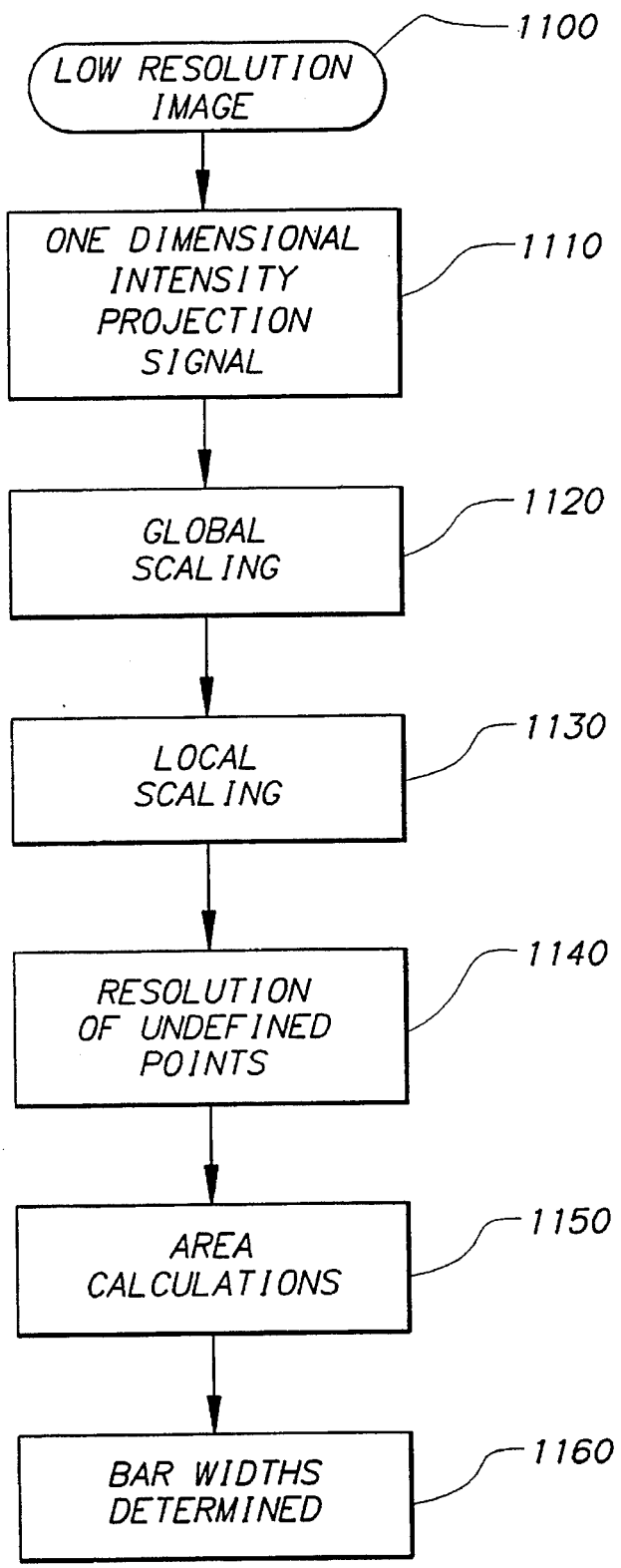
FIG. 11 is a flow diagram illustrating the operation of a preferred system for determining bar widths from a two-dimensional image representative of a bar code symbol according to the present invention.

Referring now to FIG. 11, there is shown a flow diagram illustrating the operation of a preferred system for determining bar widths associated with a selected object region from a two-dimensional image 1100 representative of a bar code symbol. In a preferred embodiment, image 1100 is a low resolution image formed of gray scale pixels from intensity image 100. The system shown includes means 1110 for forming a one-dimensional intensity projection signal from two-dimensional image 1100, means 1120 for globally scaling the projection signal, means 1130 for locally scaling the projection signal, means 1140 for resolving undefined points in the projection signal, means 1150 for calculating the areas of a plurality of regions described by the projection signal and means 1160 for determining a plurality of bar widths from the areas calculated by means 1150.

Figure 14:
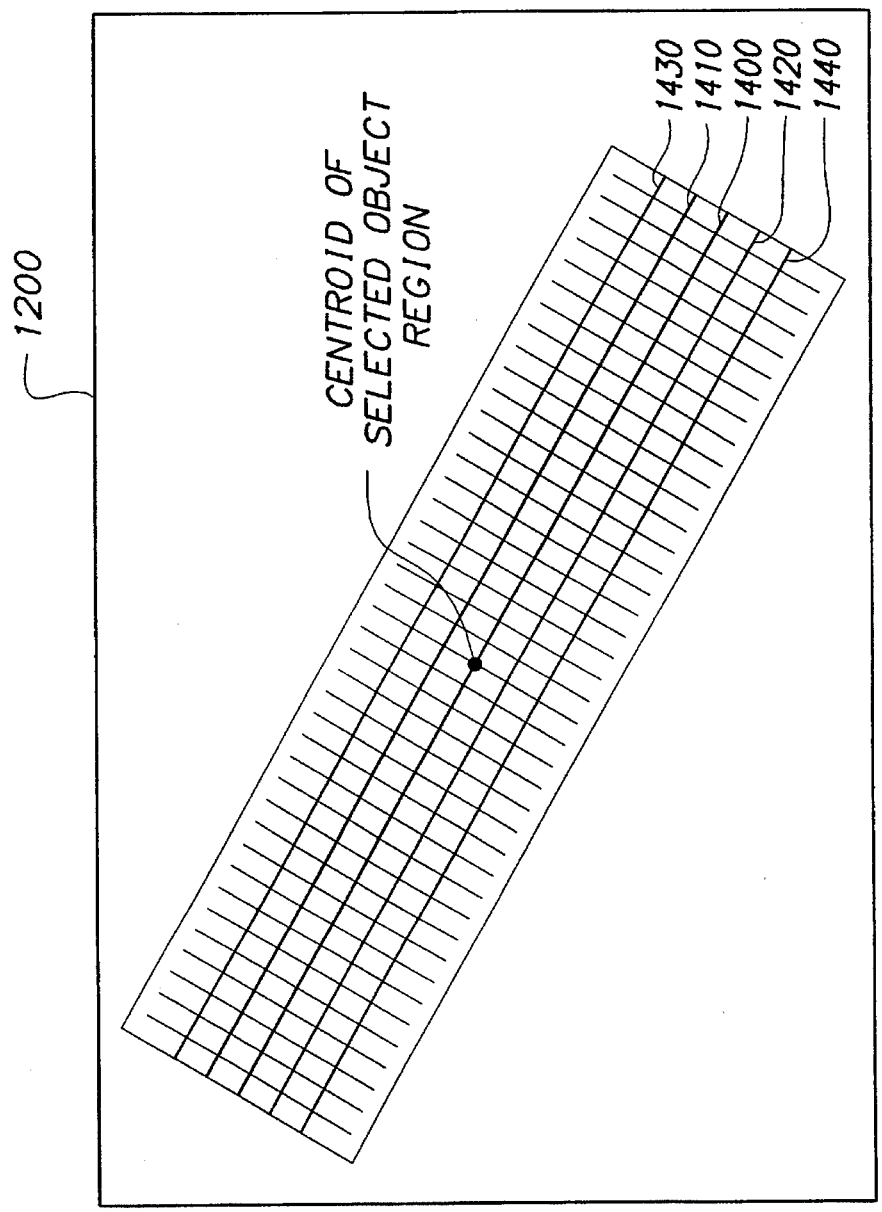
FIG. 14 shows an exemplary low resolution image having a plurality of scan lines superimposed thereon in accordance with a preferred embodiment of the present invention.

In accordance with the preferred embodiment of the present invention, means 1110 selects as an initial scan line a line which (i) passes through the center of mass of the selected object region (as determined by means 520) and (ii) has a slope that is equal to fine angular orientation value determined by system 900. For purposes of illustration, an exemplary initial scan line 1400 is shown in FIG. 14.

Figure 12:
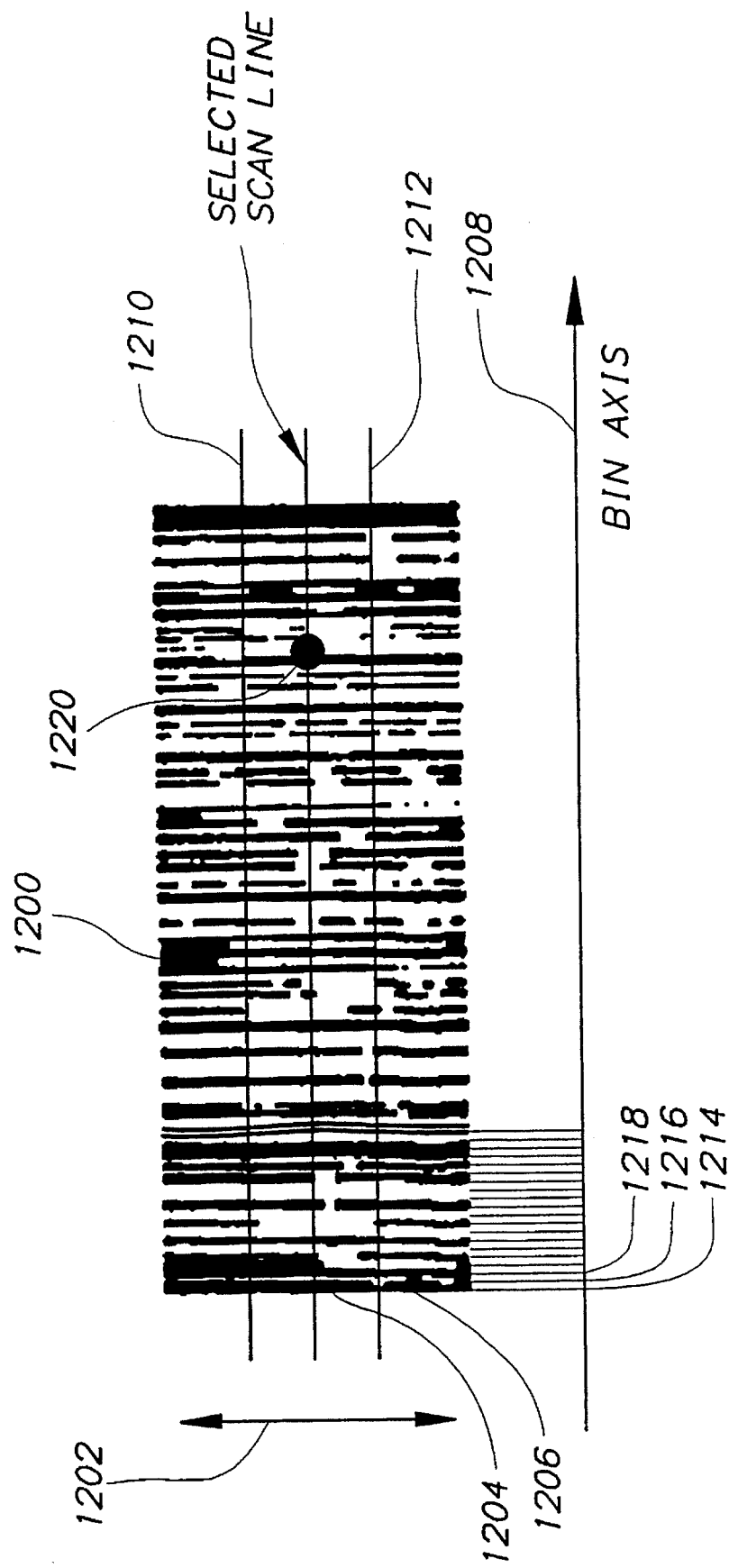
FIG. 12 shows an exemplary low resolution image for processing by the image processing system of the present invention.

FIG. 12 shows a portion 1200 of an exemplary low resolution image to be processed according to the image processing system of the present invention. Low resolution image portion 1200 is representative of a bar code symbol having bars oriented parallel to the bar direction shown by arrow 1202. Bar direction 1202 is preferably determined as being perpendicular to the fine angular orientation value determined by system 900. In alternate embodiments, bar direction 1202 may be determined either from (i) finder points (not shown) in the quiet zone of the bar code symbol, (ii) through the application of equation (2) above to the edges of image 1200 or (iii) by computing the major axis of image 1200.

Referring now to FIG. 12, a two-dimensional portion of image 1200 lying along the selected scan line is next divided into a plurality of two-dimensional sections (or bins) 1204, 1206. Bins 1204, 1206 are oriented parallel to bin axis 1208 and perpendicular to bar direction 1202. Thus, bin 1204 is bounded on its top and bottom by reference lines 1210, 1212 and on its left and right by reference lines 1214, 1216. Similarly, bin 1206 is bounded on its top and bottom by reference lines 1210, 1212 and on its left and right by reference lines 1216, 1218. Reference lines 1210, 1212 are each parallel to the selected scan line and, in the preferred embodiment, reference lines 1210, 1212 are each separated from the selected scan by a distance equivalent to 6 pixels.

Figure 13A:
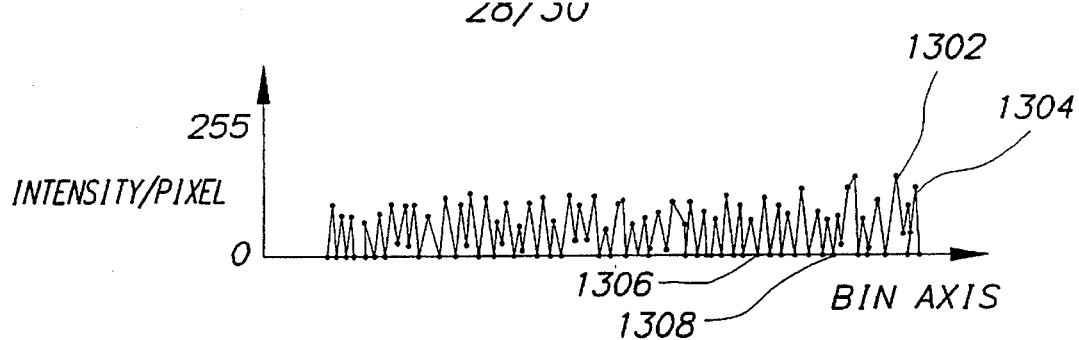
FIG. 13A shows a one-dimensional intensity projection image derived from a low resolution image representative of a bar code symbol according to the present invention.

Next, the present invention determines information representative of the intensity of the pixels in each bin 1204, 1206. This intensity information determination is preferably made for a given bin by calculating the average intensity of all pixels in that bin. Means 1110 then forms a one-dimensional projection signal by plotting this intensity information for each bin 1204, 1206 along the bin axis. FIG. 13A shows an exemplary one-dimensional projection signal derived from a low resolution image representative of a bar code symbol in accordance with the method described above. By originally calculating each point in the projection signal from a two-dimension section (or bin), it was found that the present image processing system could be used to recover bar widths even from a corrupted bar code symbol which included a defect such as spot 1220.

The output of means 1110 is provided to means 1120 for performing a first global scaling operation on a projection signal in accordance with a minimum global scaling parameter and a maximum global scaling parameter. Means 1120 includes means for determining a plurality of local maximum values (1302, 1304) from the projection signal, and means for determining a plurality of local minimum values (1306, 1308) from the projection signal. In the preferred embodiment, a local maximum value is determined at each peak in the projection signal, and a local minimum value is determined at the bottom of each valley in the projection signal. Means 1120 determines a maximum global scaling parameter ($P_{max}$) by averaging the local maximum values determined above, and a minimum global scaling parameter ($P_{min}$) by averaging the local minimum values determined above.

Means 1120 globally scales the projection signal by "stretching" the projection signal so that it extends along its entire dynamic range. In a preferred embodiment of the first global scaling method, all values of the projection signal exceeding $P_{max}$ are first rectified to $P_{max}$, and all values of the projection signal below $P_{min}$ are rectified to $P_{min}$. Means 1120 then globally scales each pixel (P) in the rectified projection signal according to equation (3) below:

$$P_{GS} = P*(\text{dynamic range})/(P_{max} - P_{min}) \qquad (3)$$

Figure 13B:
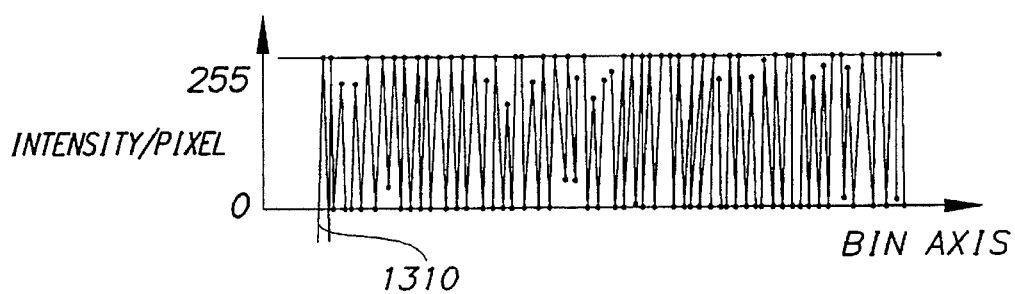
FIG. 13B shows an exemplary projection signal derived from the application of the first global scaling method of the present invention to the projection signal of FIG. 13A.

The exemplary projection signal of FIG. 13A was determined from an image formed of 8-bit pixels having a dynamic range from 0 to 255. FIG. 13B shows an exemplary projection signal derived from the application of the first global scaling method described above to the projection signal of FIG. 13A.

The output of means 1120 is provided to means 1130 for locally scaling a projection signal in accordance with the local maximum and minimum values determined above. Means 1130 includes means for positioning a sliding window (1310) on pixels from the globally scaled projection signal, means for calculating a contrast value for pixels in the window, means for locally scaling pixels in the window and means for marking pixels in the window as undefined. As shown in equation (4) below, means 1130 calculates a contrast value ($C_{win}$) for pixels in the sliding window by subtracting the maximum value ($Max_{win}$) in the window from the minimum value in the window ($Min_{win}$) and dividing this amount by the maximum of the dynamic range:

$$C_{win} = (Max_{win} - Min_{win})/(\text{dynamic range}) \qquad (4)$$

Means 1130 then compares $C_{win}$ against a predetermined threshold ($T_{11}$). If $C_{win}$ is greater than $T_{11}$, then means 1130 locally scales the pixels in the window; otherwise, means 1130 marks the pixels in the window as undefined. In a preferred embodiment, after the pixels in window 1310 are processed as above, the window is moved to the right by one bin and the process is repeated. The process continues for the full length of the projection signal.

Means 1130 locally scales the pixels in a window by "stretching" the pixels in the window so that they extend along the entire dynamic range. In a preferred embodiment, means 1130 locally scales each pixel (P) in a window according to equation (5) below:

$$P_{LS} = P*(\text{dynamic range})/(Max_{win} - Min_{win}) \qquad (5)$$

In an alternative preferred embodiment, means 1130 searches the globally scaled projection signal for pairs of subsequent local peaks/valleys, and forms a locally scaled projection signal by linearly interpolating between each such subsequent pair.

Figure 13C:
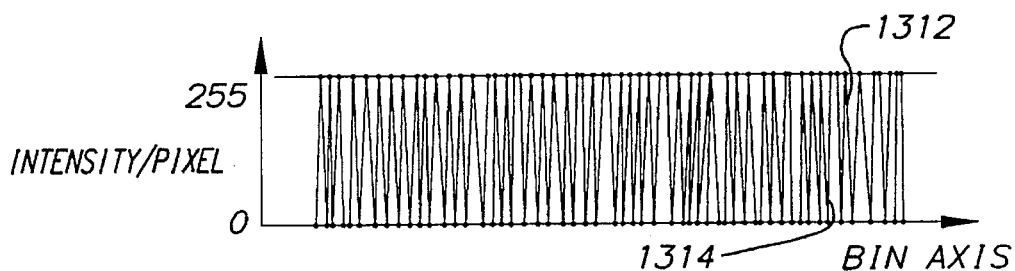
FIG. 13C shows an exemplary projection signal derived from the application of the local scaling and interpolation methods of the present invention to the projection signal of FIG. 13B.
Figure 13D:
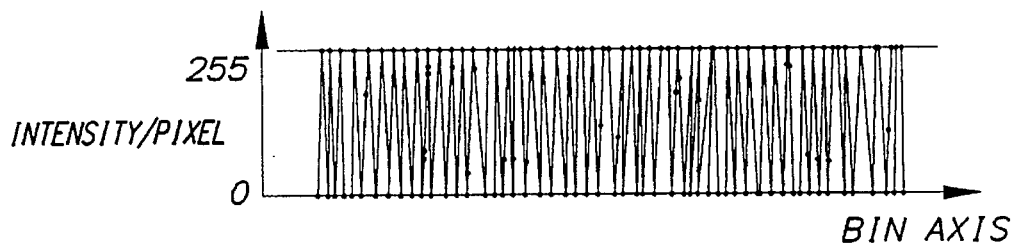
FIG. 13D shows an exemplary projection signal derived from the application of the second global scaling method of the present invention to the projection signal of FIG. 13C.

The output of means 1130 is provided to means 1140 for resolving any pixels marked undefined by means 1130. In a preferred embodiment, means 1140 resolves a pixel marked undefined by linearly interpolating between the closest defined pixels on either side of the undefined pixel. FIG. 13C shows an exemplary projection signal derived from the application of the local scaling and interpolation methods described above to the projection signal of FIG. 13B. In determining the projection signal of FIG. 13C, a window (or bin) width of approximately 5 pixels was employed and $T_{11}$ was set to approximately 15% of the full dynamic range. In the preferred embodiment, means 1140 also performs a second global scaling operation following the linear interpolation step described above. In this second global scaling operation, any peaks (1312) or valleys (1314) not spanning the full dynamic range are stretched to the limits of the dynamic range. FIG. 13D shows an exemplary projection signal derived from the application of this second global scaling method to the projection signal of FIG. 13C.

Figure 13E:
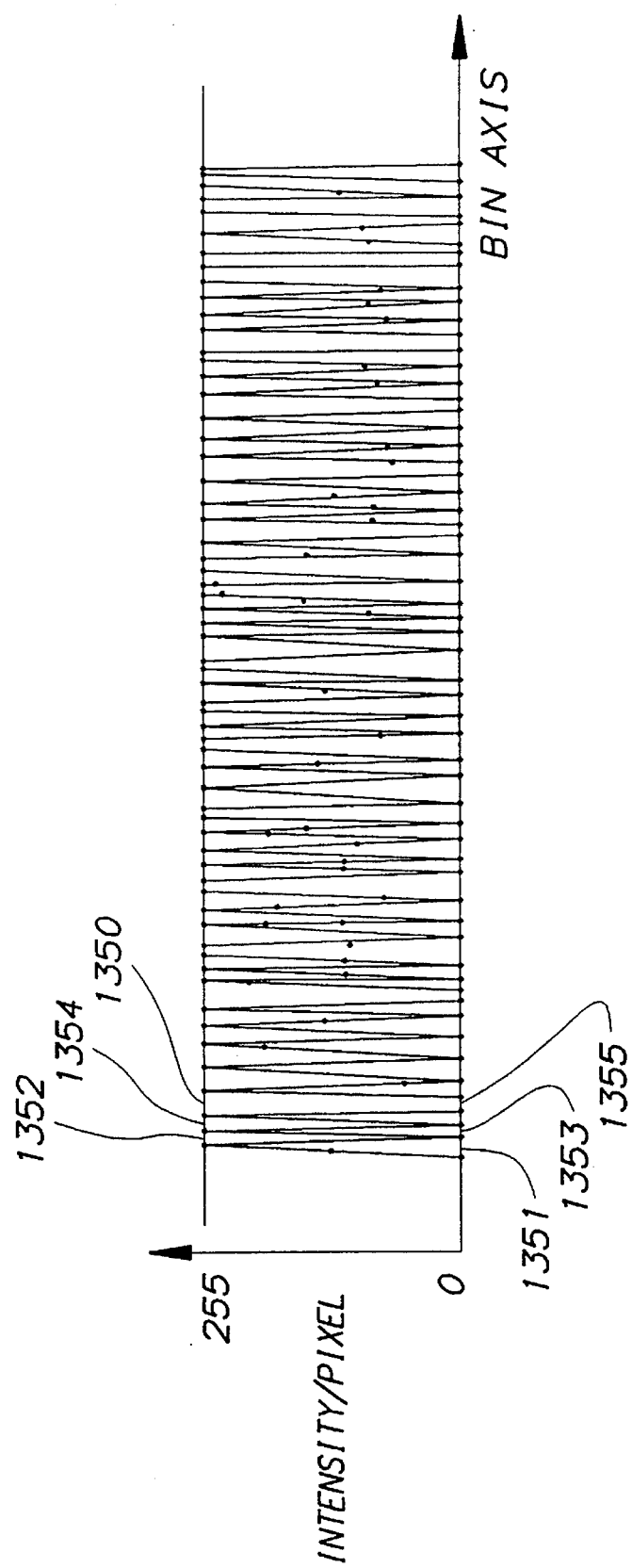
FIG. 13E is an expanded representation of the projection signal of FIG. 13D.

The output of means 1140 is provided to means 1150 for calculating the areas of a plurality of regions described by the projection signal. Referring now to FIG. 13E, there is shown an expanded view of the projection signal of FIG. 13D. Means 1150 calculates a value representative of each area 1351, 1352, 1353, 1354, 1355, 1356 bounded by the projection signal. In the projection signal shown in FIG. 13E, every area is alternatively representative of either a black or a white bar. Thus, areas 1351, 1353, 1355 are representative of black bars, and areas 1352, 1354, 1356 are representative of white bars. The widths of the bars in the bar code symbol being processed are determined from the calculated areas, and an attempt is made to decode the bar code symbol. If the bar code symbol cannot be successfully decoded because, for example, there was a checksum error, then means 1110 selects a further scan line (1410, 1420, 1430, 1440) and the process is repeated until either a bar code symbol is successfully decoded or five scan lines have been processed. If, after processing five scan lines, a bar code symbol has not been successfully decoded, then a determination is made that the selected object region provided by means 500 cannot be successfully decoded.

The present invention may be embodied in other specific forms without departing from the spirit or essential attributes of the invention. Accordingly, reference should be made to the appended claims, rather than the foregoing specification, as indicating the scope of the invention.

What is claimed is:

1. A method for determining the fine angular orientation of a bar code symbol in a two-dimensional pixel image comprising the steps of:

(A) selecting a window from said two-dimensional image for processing;

(B) determining an edge magnitude and an edge direction for a plurality of pixels in said selected window;

(C) selecting a pixel from said plurality of pixels;

(D) if said edge magnitude associated with said selected pixel exceeds a first predetermined threshold, then associating said edge magnitude and said edge direction of said selected pixel with at least one of a plurality of directional ranges;

(E) repeating steps (C)–(D) for each pixel in said plurality of pixels;

(F) selecting one directional range from said plurality of directional ranges;

(G) determining a density value associated with said selected directional range in accordance with the number of pixels associated with said selected directional range;

(H) repeating steps (F)–(G) for each of said plurality of directional ranges;

(I) selecting at least one candidate directional range in accordance with said associated density values; and (J) determining said fine angular orientation in accordance with said edge directions associated with said at least one candidate directional range.

2. The method of claim 1, wherein step (G) further comprises the step of determining a deviation value associated with said selected directional range in accordance with said edge directions associated with said selected directional range, and wherein said at least one candidate directional range is selected in step (I) in accordance with said associated deviation and density values.

3. The method of claim 2, wherein said deviation value in step (G) is determined in accordance with the standard deviation of said edge directions associated with said selected directional range.

4. The method of claim 3, wherein step (G) further comprises the step of determining an angular mean value associated with said selected directional range in accordance with said edge directions associated with said selected directional range, and step (I) comprises selecting at least one candidate directional range in accordance with said associated deviation, density and angular mean values.

5. The method of claim 4, wherein said angular mean in step (G) is determined in accordance with the mean of said edge directions associated with said selected directional range.

6. The method of claim 4, wherein step (I) comprises the steps of:

i. selecting one directional range from said plurality of directional ranges;
  ii. determining said selected directional range to be a candidate directional range if said density value associated with said selected directional range exceeds a second predetermined threshold, said deviation value associated with said selected directional range is less than a third predetermined threshold, and said angular mean value associated with said selected directional range differs from the angular center of said selected directional range by less than a fourth predetermined threshold;
  iii. repeating steps i.–ii. for each of said plurality of directional ranges; and step (J) comprises the steps of:

i. if a plurality of candidate directional ranges were selected in step (I)ii., then selecting from said plurality of candidate directional ranges the directional range associated with the smallest deviation value and determining said fine angular orientation to be the angular mean value associated with said selected candidate directional range;
  ii. if a single candidate directional range was selected in step (I)ii., then determining said fine angular orientation to be the angular mean value associated with said single candidate directional range.

7. The method of claim 6, wherein step (A) comprises the steps of:

i. selecting an object region from said two-dimensional pixel image;
  ii. determining the spatial coordinates of the center of mass associated with said selected object region;
  iii. selecting a window of pixels centered about said spatial coordinates.

8. The method of claim 7, wherein if no candidate directional range was selected in step (I)ii., then sequentially translating said window about said spatial coordinates and repeating steps (B)–(I) until at least one candidate directional range is selected in step (I)ii.

9. A method for determining the fine angular orientation of a bar code symbol in a two-dimensional pixel image comprising the steps of:

(A) selecting a window from said two-dimensional image for processing;
  (B) determining an edge magnitude and an edge direction for a plurality of pixels in said selected window;
  (C) selecting a pixel from said plurality of pixels;
  (D) if said edge magnitude associated with said selected pixel exceeds a first predetermined threshold, then associating said edge magnitude and said edge direction of said selected pixel with at least one of a plurality of directional ranges;
  (E) repeating steps (C)–(D) for each pixel in said plurality of pixels;
  (F) selecting one directional range from said plurality of directional ranges;
  (G) determining a deviation value associated with said selected directional range in accordance with said edge directions associated with said selected directional range;
  (H) repeating steps (F)–(G) for each of said plurality of directional ranges;
  (I) selecting at least one candidate directional range in accordance with said associated deviation values; and
  (J) determining said fine angular orientation in accordance with said edge directions associated with said at least one candidate directional range.

10. The method of claim 9, wherein said deviation value in step (G) is determined in accordance with the standard deviation of said edge directions associated with said selected directional range.

11. The method of claim 9, wherein step (G) further comprises the step of determining an angular mean value associated with said selected directional range in accordance with said edge directions associated with said selected directional range, and step (I) comprises selecting at least one candidate directional range in accordance with said associated deviation and angular mean values.

12. The method of claim 11, wherein said angular mean in step (G) is determined in accordance with the mean of said edge directions associated with said selected directional range.

13. The method of claim 9, wherein step (A) comprises the steps of:

i. selecting an object region from said two-dimensional pixel image;
  ii. determining the spatial coordinates of the center of mass associated with said selected object region;
  iii. selecting a window of pixels centered about said spatial coordinates.

14. A method for determining the fine angular orientation of a bar code symbol in a two-dimensional pixel image comprising the steps of:

(A) selecting a window from said two-dimensional image for processing;
  (B) determining an edge magnitude and an edge direction for a plurality of pixels in said selected window;
  (C) selecting a pixel from said plurality of pixels;
  (D) if said edge magnitude associated with said selected pixel exceeds a first predetermined threshold, then associating said edge magnitude and said edge direction of said selected pixel with at least one of a plurality of directional ranges;
  (E) repeating steps (C)–(D) for each pixel in said plurality of pixels;
  (F) selecting one directional range from said plurality of directional ranges;
  (G) determining an angular mean value associated with said selected directional range in accordance with said edge directions associated with said selected directional range;

(H) repeating steps (F)–(G) for each of said plurality of directional ranges;

(I) selecting at least one candidate directional range in accordance with said associated angular mean values; and (J) determining said fine angular orientation in accordance with said edge directions associated with said at least one candidate directional range.

15. The method of claim 14, wherein step (G) further comprises the step of determining a deviation value associated with said selected directional range in accordance with said edge directions associated with said selected directional range, and wherein said at least one candidate directional range is selected in step (I) in accordance with said associated deviation and angular mean values.

16. The method of claim 15, wherein said deviation value in step (G) is determined in accordance with the standard deviation of said edge directions associated with said selected directional range.

17. The method of claim 14, wherein step (A) comprises the steps of:

i. selecting an object region from said two-dimensional pixel image;

ii. determining the spatial coordinates of the center of mass associated with said selected object region;

iii. selecting a window of pixels centered about said spatial coordinates.

18. An apparatus for determining the fine angular orientation of a bar code symbol in a two-dimensional pixel image comprising:

(A) a window selector for selecting a window from said two-dimensional image for processing;

(B) means for determining an edge magnitude and an edge direction for each of a plurality of pixels in said selected window;

(C) a classifier for associating said edge magnitude and said edge direction of a selected pixel with at least one of a plurality of directional ranges if said edge magnitude associated with said selected pixel exceeds a first predetermined threshold;

(D) means for applying said classifier to each of said plurality of pixels;

(E) a calculator for determining a density value associated with a selected directional range in accordance with the number of pixels associated with said selected directional range;

(F) means for applying said calculator to each of said plurality of directional ranges;

(G) a candidate directional range selector for selecting at least one candidate directional range in accordance with said associated density values; and (H) means for determining said fine angular orientation in accordance with said edge directions associated with said at least one candidate directional range.

19. The apparatus of claim 18, wherein said calculator further comprises means for determining a deviation value associated with said selected directional range in accordance with said edge directions associated with said selected directional range, and wherein said candidate directional range selector comprises means for selecting said at least one candidate directional range in accordance with said associated deviation and density values.

20. The apparatus of claim 19, wherein said deviation value is determined in accordance with the standard deviation of said edge directions associated with said selected directional range.

21. The apparatus of claim 19, wherein said calculator further comprises means for determining an angular mean value associated with said selected directional range in accordance with said edge directions associated with said selected directional range, and said candidate directional range selector comprises means for selecting at least one candidate directional range in accordance with said associated deviation, density and angular mean values.

22. The apparatus of claim 21, wherein said angular mean is determined in accordance with the mean of said edge directions associated with said selected directional range.

23. The apparatus of claim 21, wherein said candidate directional ranges selector comprises:

i. means for selecting one directional range from said plurality of directional ranges;

ii. means for determining said selected directional range to be a candidate directional range if said density value associated with said selected directional range exceeds a second predetermined threshold, said deviation value associated with said selected directional range is less than a third predetermined threshold, and said angular mean value associated with said selected directional range differs from the angular center of said selected directional range by less than a fourth predetermined threshold.

24. The apparatus of claim 18, wherein said window selector comprises:

i. an object region selector for selecting an object region from said two-dimensional pixel image;

ii. means for determining the spatial coordinates of the center of mass associated with said selected object region;

iii. means for selecting a window of pixels centered about said spatial coordinates.

25. The apparatus of claim 24, further comprising means for sequentially translating said window about said spatial coordinates until at least one candidate directional range is selected.

26. An apparatus for determining the fine angular orientation of a bar code symbol in a two-dimensional pixel image comprising:

(A) a window selector for selecting a window from said two-dimensional image for processing;

(B) means for determining an edge magnitude and an edge direction for each of a plurality of pixels in said selected window;

(C) a classifier for associating said edge magnitude and said edge direction of a selected pixel with at least one of a plurality of directional ranges if said edge magnitude associated with said selected pixel exceeds a first predetermined threshold;

(D) means for applying said classifier to each of said plurality of pixels;

(E) a calculator for determining a deviation value associated with a selected directional range in accordance with said edge directions associated with said selected directional range;

(F) means for applying said calculator to each of said plurality of directional ranges;

(H) a candidate directional range selector for selecting at least one candidate directional range in accordance with said associated deviation values; and (I) means for determining said fine angular orientation in accordance with said edge directions associated with said at least one candidate directional range.

27. The apparatus of claim 26, wherein said deviation value is determined in accordance with the standard deviation of said edge directions associated with said selected directional range.

28. The apparatus of claim 26, wherein said calculator further comprises means for determining an angular mean value associated with said selected directional range in accordance with said edge directions associated with said selected directional range, and said candidate directional range selector comprises means for selecting at least one candidate directional range in accordance with said associated deviation and angular mean values.

29. The apparatus of claim 28, wherein said angular mean is determined in accordance with the mean of said edge directions associated with said selected directional range.

30. The apparatus of claim 26, wherein said window selector comprises:

i. an object region selector for selecting an object region from said two-dimensional pixel image;
   ii. means for determining the spatial coordinates of the center of mass associated with said selected object region;
   iii. means for selecting a window of pixels centered about said spatial coordinates.

31. An apparatus for determining the fine angular orientation of a bar code symbol in a two-dimensional pixel image comprising:

(A) a window selector for selecting a window from said two-dimensional image for processing;
   (B) means for determining an edge magnitude and an edge direction for each of a plurality of pixels in said selected window;
   (C) a classifier for associating said edge magnitude and said edge direction of a selected pixel with at least one of a plurality of directional ranges if said edge magnitude associated with said selected pixel exceeds a first predetermined threshold;
   (D) means for applying said classifier to each of said plurality of pixels;
   (E) a calculator for determining an angular mean value associated with a selected directional range in accordance with said edge directions associated with said selected directional range;
   (F) means for applying said calculator to each of said plurality of directional ranges;
   (G) a candidate directional range selector for selecting at least one candidate directional range in accordance with said associated angular mean values; and
   (H) means for determining said fine angular orientation in accordance with said edge directions associated with said at least one candidate directional range.

32. The apparatus of claim 31, wherein said calculator further comprises means for determining a deviation value associated with said selected directional range in accordance with said edge directions associated with said selected directional range, and wherein said candidate directional range selector comprises means for selecting said at least one candidate directional range in accordance with said associated deviation and angular mean values.

33. The apparatus of claim 32, wherein said deviation value is determined in accordance with the standard deviation of said edge directions associated with said selected directional range.

34. The apparatus of claim 31 wherein said window selector comprises:

i. an object region selector for selecting an object region from said two-dimensional pixel image;
   ii. means for determining the spatial coordinates of the center of mass associated with said selected object region;
   iii. means for selecting a window of pixels centered about said spatial coordinates.

* * * * *